(12) United States Patent
Liu et al.

(10) Patent No.: US 12,610,427 B2
(45) Date of Patent: Apr. 21, 2026

(54) NON-TERRESTRIAL NETWORK (NTN) DISCONTINUOUS OPERATION COEXISTENCE

(71) Applicant: QUALCOMM Incorporated, San Diego, CA (US)

(72) Inventors: Le Liu, San Jose, CA (US); Xiao Feng Wang, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 18/459,054

(22) Filed: Aug. 31, 2023

(65) Prior Publication Data

US 2025/0081283 A1 Mar. 6, 2025

(51) Int. Cl.
*H04W 76/28* (2018.01)
*H04B 7/185* (2006.01)
*H04W 72/0453* (2023.01)

(52) U.S. Cl.
CPC ........ *H04W 76/28* (2018.02); *H04B 7/18513* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2017/0105219 A1 | 4/2017 | Sebire | |
| 2024/0235651 A9 * | 7/2024 | Cheema | ............... H04B 7/0695 |

FOREIGN PATENT DOCUMENTS

| | | | | |
|---|---|---|---|---|
| WO | WO-2022111434 A1 * | 6/2022 | ........... | H04B 7/1853 |
| WO | WO-2022175926 A1 * | 8/2022 | ......... | H04B 7/06952 |

OTHER PUBLICATIONS

International Search Report and Written Opinion—PCT/US2024/041079—ISA/EPO—Nov. 6, 2024.

* cited by examiner

*Primary Examiner* — Kouroush Mohebbi
(74) *Attorney, Agent, or Firm* — Holland & Hart LLP

(57) ABSTRACT

Methods, systems, and devices for wireless communications are described. A user equipment (UE) may receive control messages including information indicative of a resource allocation associated with a discontinuous operation at a serving cell of the UE. The resource allocation may further be associated with at least one non-terrestrial network (NTN) cell serving a coverage area including the UE. The UE may communicate, during an active period associated with the discontinuous operation, data messages via frequency resources of a first frequency band in accordance with the resource allocation associated with the discontinuous operation. The active period at the serving cell may be non-overlapping with a second active period associated with a second discontinuous operation at a second cell. The UE may communicate, during an inactive period associated with the discontinuous operation, signals via frequency resources of a second frequency band in accordance with the resource allocation associated with the discontinuous operation.

30 Claims, 17 Drawing Sheets

205-a 125-a 125-b 105-a

210

Gateway 110-b 110-a

200

1210

1220

1215

1205

1200

130          105                    115

Network
Entity

Transceiver          Antenna 1510                 1515

Memory

Communications
Manager          Code

1530

1520          1525

1540          Processor

1535

1505

1500

Figure 16:
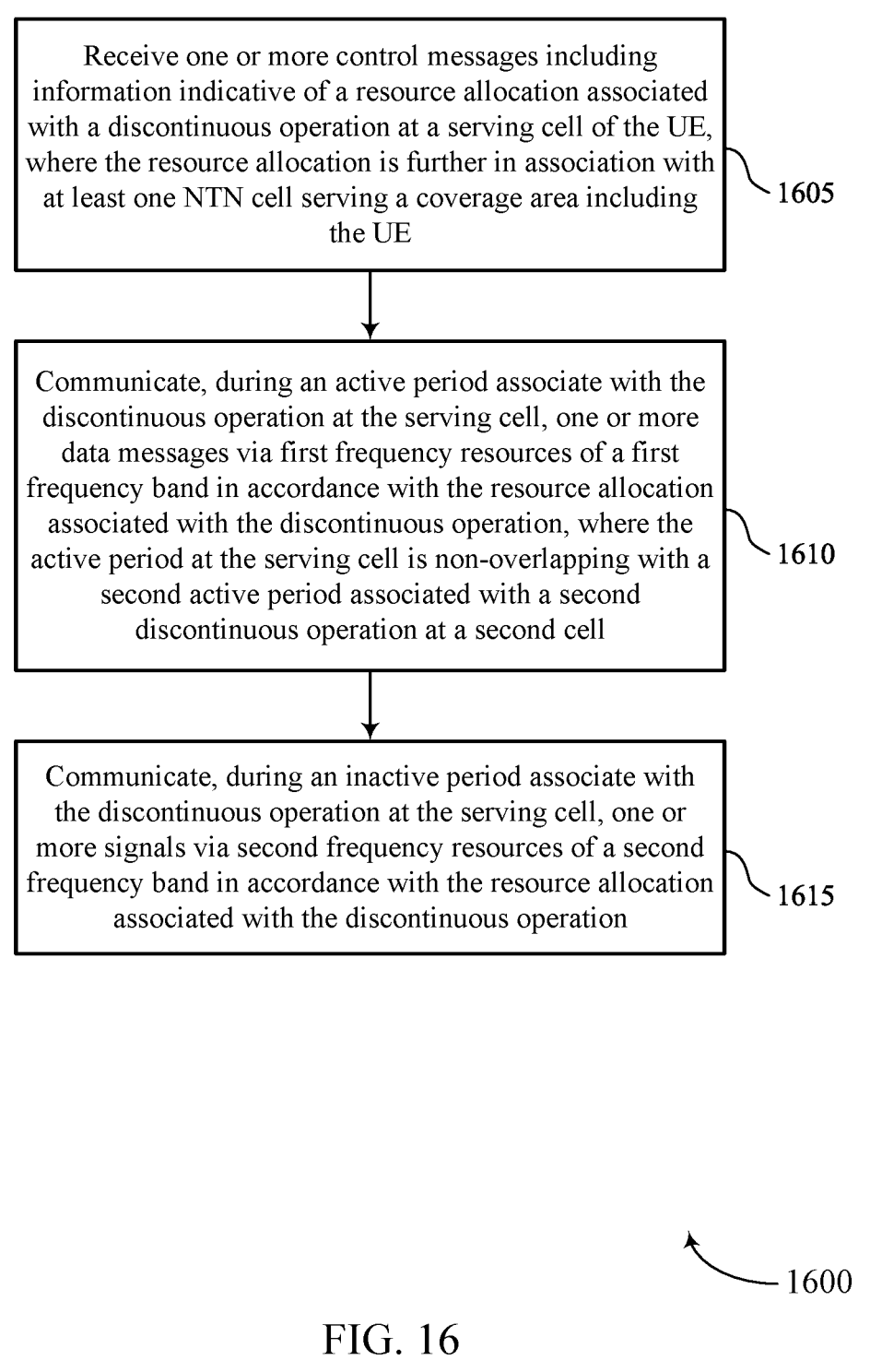

Receive one or more control messages including information indicative of a resource allocation associated with a discontinuous operation at a serving cell of the UE, where the resource allocation is further in association with at least one NTN cell serving a coverage area including the UE

1605

Communicate, during an active period associate with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell

1610

Communicate, during an inactive period associate with the discontinuous operation at the serving cell, one or more signals via second frequency resources of a second frequency band in accordance with the resource allocation associated with the discontinuous operation

Figure 17:
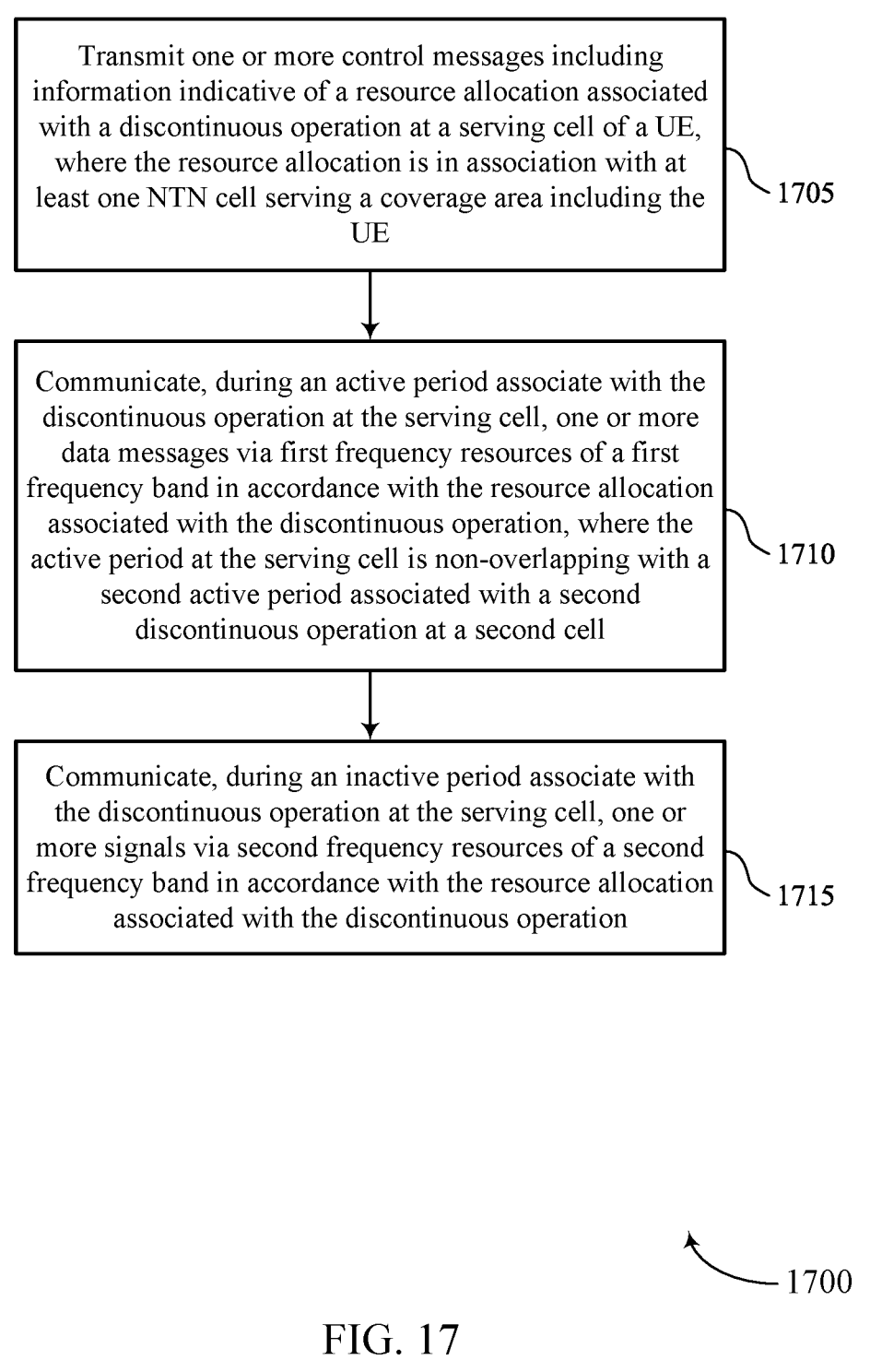

Transmit one or more control messages including information indicative of a resource allocation associated with a discontinuous operation at a serving cell of a UE, where the resource allocation is in association with at least one NTN cell serving a coverage area including the UE

↳ 1705

Communicate, during an active period associate with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell

↳ 1710

Communicate, during an inactive period associate with the discontinuous operation at the serving cell, one or more signals via second frequency resources of a second frequency band in accordance with the resource allocation associated with the discontinuous operation

NON-TERRESTRIAL NETWORK (NTN) DISCONTINUOUS OPERATION COEXISTENCE

FIELD OF TECHNOLOGY

The following relates to wireless communications, including non-terrestrial network (NTN) discontinuous operation coexistence.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Wireless communications systems may include non-terrestrial network (NTN) devices, terrestrial network devices, or both.

SUMMARY

The described techniques relate to improved methods, systems, devices, and apparatuses that support non-terrestrial network (NTN) discontinuous operation coexistence. For example, the described techniques provide for receiving, at a user equipment (UE), control messages indicating a resource allocation associated with a discontinuous operation at a serving cell of the UE. The serving cell of the UE may be an NTN cell or a terrestrial network (TN) cell. The resource allocation may be associated with at least one NTN cell serving a coverage area including the UE. That is, an NTN cell may be the serving cell of the UE or a neighboring cell of (e.g., adjacent to) the serving cell of the UE and, in either case, such a presence of the NTN cell may influence, contribute toward, motivate, imply, or lead to the specific resource allocation provided to the UE.

The UE may communicate (e.g., transmit and/or receive), during an active period associated with the discontinuous operation at the serving cell, via first frequency resources of a first frequency band according to the resource allocation associated with the discontinuous operation. The active period at the serving cell may be non-overlapping with a second active period associated with a second discontinuous operation at a second cell (e.g., a neighboring cell or an adjacent cell, with which the UE may or may not actively communicate). The UE may communicate (e.g., transmit and/or receive), during an inactive period associated with the discontinuous operation at the serving cell, via second frequency resources of a second frequency band in accordance with the resource allocation associated with the discontinuous operation. For example, the UE may still be expected or scheduled to transmit and/or receive one or more signals or messages during inactive periods associated with the discontinuous operation, with such one or more signals or messages being restricted to the second frequency band in accordance with the resource allocation. The second frequency band may be smaller than (such as a subset of) the first frequency band.

A method for wireless communication by a UE is described. The method may include receiving one or more control messages including information indicative of a resource allocation associated with a discontinuous operation at a serving cell of the UE, where the resource allocation is further in association with at least one NTN cell serving a coverage area including the UE, communicating, during an active period associated with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell, and communicating, during an inactive period associated with the discontinuous operation at the serving cell, one or more signals via second frequency resources of a second frequency band in accordance with the resource allocation associated with the discontinuous operation.

A UE is described. The UE may include one or more processors and one or more memories coupled with the one or more processors. The UE may further include one or more processor-readable instructions stored in the one or more memories and executable by the one or more processors, individually or collectively, to cause the UE to receive one or more control messages including information indicative of a resource allocation associated with a discontinuous operation at a serving cell of the UE, where the resource allocation is further in association with at least one NTN cell serving a coverage area including the UE, communicating, during an active period associate with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell, and communicating, during an inactive period associate with the discontinuous operation at the serving cell, one or more signals via second frequency resources of a second frequency band in accordance with the resource allocation associated with the discontinuous operation.

Another UE is described. The UE may include means for receiving one or more control messages including information indicative of a resource allocation associated with a discontinuous operation at a serving cell of the UE, where the resource allocation is further in association with at least one NTN cell serving a coverage area including the UE, means for communicating, during an active period associated with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell, and means for communicating, during an inactive period associated with the discontinuous operation at the serving cell, one or more signals via second frequency resources of a second frequency band in accordance with the resource allocation associated with the discontinuous operation.

A non-transitory computer-readable medium storing code for wireless communication is described. The code may include instructions executable by at least one processor, individually or collectively, to receive one or more control messages including information indicative of a resource allocation associated with a discontinuous operation at a serving cell of the UE, where the resource allocation is further in association with at least one NTN cell serving a coverage area including the UE, communicating, during an active period associate with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell, and communicating, during an inactive period associate with the discontinuous operation at the serving cell, one or more signals via second frequency resources of a second frequency band in accordance with the resource allocation associated with the discontinuous operation.

Some examples of the method, UEs, and non-transitory computer-readable medium described herein may further include operations, features, means, or instructions for communicating a synchronization signal block (SSB), a system information block (SIB), a random access channel (RACH) message, one or more reference signals, or a combination thereof via one or more reserved resources during the inactive period, where the one or more signals include the SSB, the SIB, the RACH message, the one or more reference signals, or the combination thereof, and where the one or more reserved resources include the second frequency resources of the second frequency band.

Some examples of the method, UEs, and non-transitory computer-readable medium described herein may further include operations, features, means, or instructions for refraining from communicating, during the active period, via a subset of frequency resources of the first frequency band in accordance with the resource allocation associated with the discontinuous operation, where the subset of frequency resources may be reserved for one or more second signals communicated between a second UE and the second cell.

In some examples of the method, UEs, and non-transitory computer-readable medium described herein, the one or more second signals include a SSB, an SIB, a RACH message, one or more reference signals, or a combination thereof.

Some examples of the method, UEs, and non-transitory computer-readable medium described herein may further include operations, features, means, or instructions for receiving, via the one or more control messages, an indication that the first frequency band may be configured as a secondary cell activated during a first portion of the active period and deactivated during a second portion of the active period and the inactive period and receiving, via the one or more control messages, an indication that the second frequency band may be configured as a primary cell activated during both the active period and the inactive period.

In some examples of the method, UEs, and non-transitory computer-readable medium described herein, communicating, during the first portion of the active period, via the primary cell or the secondary cell in accordance with the resource allocation associated with the discontinuous operation and communicating, during the second portion of the active period and the inactive period, via the primary cell in accordance with the resource allocation associated with the discontinuous operation.

In some examples of the method. UEs, and non-transitory computer-readable medium described herein, communication of the one or more signals may be restricted from the secondary cell in accordance with the resource allocation associated with the discontinuous operation.

Some examples of the method, UEs, and non-transitory computer-readable medium described herein may further include operations, features, means, or instructions for receiving, via the one or more control messages, an indication that the first frequency band may be configured as a first bandwidth part activated during a first portion of the active period and deactivated during a second portion of the active period and the inactive period and receiving, via the one or more control messages, an indication that the second frequency band may be configured as a second bandwidth part activated during the second portion of the active period and the inactive period and deactivated during the first portion of the active period.

In some examples of the method, UEs, and non-transitory computer-readable medium described herein, communicating, during the first portion of the active period, via the first bandwidth part in accordance with the resource allocation associated with the discontinuous operation and communicating, during the second portion of the active period and the inactive period, via the second bandwidth part in accordance with the resource allocation associated with the discontinuous operation.

In some examples of the method, UEs, and non-transitory computer-readable medium described herein, the second bandwidth part may be smaller than the first bandwidth part, the first bandwidth part overlaps at least partially with the second bandwidth part, and communication of the one or more signals may be restricted to the second bandwidth part when the first bandwidth may be activated and when the first bandwidth part may be deactivated in accordance with the resource allocation associated with the discontinuous operation.

Some examples of the method, UEs, and non-transitory computer-readable medium described herein may further include operations, features, means, or instructions for receiving, via the one or more control messages, an indication that the first frequency band may be configured as a first bandwidth part activated during the active period and deactivated during the inactive period and receiving, via the one or more control messages, an indication that the second frequency band may be configured as a second bandwidth part activated during the inactive period and deactivated during the active period.

In some examples of the method, UEs, and non-transitory computer-readable medium described herein, communicating, during a first portion of the active period, via the first bandwidth part in accordance with the resource allocation associated with the discontinuous operation, communicating, during a second portion of the active period, via a subset of the first bandwidth part in accordance with the resource allocation associated with the discontinuous operation, and communicating, during the inactive period, via the second bandwidth part in accordance with the resource allocation associated with the discontinuous operation.

In some examples of the method, UEs, and non-transitory computer-readable medium described herein, the second bandwidth part may be smaller than the first bandwidth part, the first bandwidth part overlaps at least partially with the second bandwidth part, the subset of the first bandwidth part may be reserved for one or more second signals communicated between a second UE and the second cell, and communication of the one or more signals may be restricted to the second bandwidth part when the first bandwidth part may be activated and when the first bandwidth part may be deactivated in accordance with the resource allocation associated with the discontinuous operation.

In some examples of the method, UEs, and non-transitory computer-readable medium described herein, communicating, during an extension of the active period, via the second frequency band in accordance with the resource allocation associated with the discontinuous operation.

In some examples of the method, UEs, and non-transitory computer-readable medium described herein, during the extension of the active period, communication to or from the UE may be restricted to the second frequency band in accordance with the resource allocation associated with the discontinuous operation.

Some examples of the method, UEs, and non-transitory computer-readable medium described herein may further include operations, features, means, or instructions for transmitting a report indicating a capability of the UE to support the resource allocation associated with the discontinuous operation, where the resource allocation may be in association with the serving cell of the UE being a first NTN cell and the second cell being a second NTN cell.

Some examples of the method, UEs, and non-transitory computer-readable medium described herein may further include operations, features, means, or instructions for transmitting a first report indicating a first capability of the UE to support the resource allocation associated with the discontinuous operation, where the resource allocation may be in association with the serving cell of the UE being an NTN cell and transmitting a second report indicating a second capability of the UE to support the resource allocation associated with the discontinuous operation, where the resource allocation may be in association with the serving cell of the UE being a terrestrial network cell.

Some examples of the method, UEs, and non-transitory computer-readable medium described herein may further include operations, features, means, or instructions for receiving an indication of ephemeris information associated with one or more cells adjacent to the serving cell, where the serving cell may be an NTN cell and the one or more cells adjacent to the serving cell may be one or more other NTN cells and determining a propagation delay for the NTN cell relative to the one or more other NTN cells based on the indication of the ephemeris information, where the resource allocation may be based on the propagation delay.

Some examples of the method, UEs, and non-transitory computer-readable medium described herein may further include operations, features, means, or instructions for receiving an activation or deactivation message associated with the discontinuous operation.

In some examples of the method, UEs, and non-transitory computer-readable medium described herein, the resource allocation may be in association with the at least one NTN cell and at least one terrestrial network cell each serving the coverage area including the UE.

Some examples of the method, UEs, and non-transitory computer-readable medium described herein may further include operations, features, means, or instructions for receiving one or more first signals via the at least one NTN cell, receiving one or more second signals via the at least one terrestrial network cell, determining a first propagation delay associated with the at least one NTN cell and a second propagation delay associated with the at least one terrestrial network cell, and transmitting a report of the first propagation delay, the second propagation delay, or both.

Some examples of the method, UEs, and non-transitory computer-readable medium described herein may further include operations, features, means, or instructions for receiving ephemeris information associated with the at least one NTN cell via an NTN configuration information element associated with the at least one NTN cell.

In some examples of the method, UEs, and non-transitory computer-readable medium described herein, the one or more signals may be restricted to the second frequency band in accordance with the resource allocation associated with the discontinuous operation and the second frequency band may be smaller than the first frequency band.

In some examples of the method, UEs, and non-transitory computer-readable medium described herein, the resource allocation allocates the first frequency band to the UE during active periods associated with the discontinuous operation and allocates the second frequency band to the UE during inactive periods associated with the discontinuous operation.

In some examples of the method, UEs, and non-transitory computer-readable medium described herein, at least a portion of the first frequency band may be non-overlapping with the second frequency band.

In some examples of the method, UEs, and non-transitory computer-readable medium described herein, the at least one NTN cell includes the serving cell of the UE, the second cell, or both and the second cell may be a neighbor cell to the serving cell of the UE.

A method for wireless communication by a network entity is described. The method may include transmitting one or more control messages including information indicative of a resource allocation associated with a discontinuous operation at a serving cell of a UE, where the resource allocation is in association with at least one NTN cell serving a coverage area including the UE, communicating, during an active period associated with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell, and communicating, during an inactive period associated with the discontinuous operation at the serving cell, one or more signals via second frequency resources of a second frequency band in accordance with the resource allocation associated with the discontinuous operation.

A network entity is described. The network entity may include one or more processors and one or more memories coupled with the one or more processors. The network entity may further include one or more processor-readable instructions stored in the one or more memories and executable by the one or more processors individually or collectively to cause the network entity to transmit one or more control messages including information indicative of a resource allocation associated with a discontinuous operation at a serving cell of a UE, where the resource allocation is in association with at least one NTN cell serving a coverage area including the UE, communicating, during an active period associate with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell, and communicating, during an inactive period associate with the discontinuous operation at the serving cell, one or more signals via second frequency resources of a second frequency band in accordance with the resource allocation associated with the discontinuous operation.

Another network entity is described. The network entity may include means for transmitting one or more control messages including information indicative of a resource allocation associated with a discontinuous operation at a serving cell of a UE, where the resource allocation is in association with at least one NTN cell serving a coverage area including the UE, means for communicating, during an active period associated with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell, and means for communicating, during an inactive period associated with the discontinuous operation at the serving cell, one or more signals via second frequency resources of a second frequency band in accordance with the resource allocation associated with the discontinuous operation.

A non-transitory computer-readable medium storing code for wireless communication is described. The code may include instructions executable by at least one processor, individually or collectively, to transmit one or more control messages including information indicative of a resource allocation associated with a discontinuous operation at a serving cell of a UE, where the resource allocation is in association with at least one NTN cell serving a coverage area including the UE, communicating, during an active period associate with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell, and communicating, during an inactive period associate with the discontinuous operation at the serving cell, one or more signals via second frequency resources of a second frequency band in accordance with the resource allocation associated with the discontinuous operation.

Some examples of the method, network entities, and non-transitory computer-readable medium described herein may further include operations, features, means, or instructions for communicating with the UE in accordance with the resource allocation associated with the discontinuous operation and communicating, during at least a portion of the inactive period, with a second UE via the first frequency band and a subset of the second frequency band, where a remainder of the second frequency band outside of the subset of the second frequency band includes the second frequency resources via which the network entity and the UE communicate the one or more signals.

In some examples of the method, network entities, and non-transitory computer-readable medium described herein, at least the portion of the inactive period during which the network entity communicates with the second UE includes a second active period associated with a second discontinuous operation at a second serving cell of the second UE.

Some examples of the method, network entities, and non-transitory computer-readable medium described herein may further include operations, features, means, or instructions for transmitting, to the at least one NTN cell and one or more additional cells, the information indicative of the resource allocation associated with the discontinuous operation at the serving cell of the UE via a gateway, where the information includes an indication of reserved resources, a propagation delay associated with the at least one NTN cell and the one or more additional cells, or both.

Some examples of the method, network entities, and non-transitory computer-readable medium described herein may further include operations, features, means, or instructions for communicating a synchronization signal block (SSB), an SIB, a RACH message, one or more reference signals, or a combination thereof via one or more reserved resources during the inactive period, where the one or more signals include the SSB, the SIB, the RACH message, the one or more reference signals, or the combination thereof, and where the one or more reserved resources include the second frequency resources of the second frequency band.

Some examples of the method, network entities, and non-transitory computer-readable medium described herein may further include operations, features, means, or instructions for transmitting, via the one or more control messages, an indication that the first frequency band may be configured as a secondary cell activated during a first portion of the active period and deactivated during a second portion of the active period and the inactive period and transmitting, via the one or more control messages, an indication that the second frequency band may be configured as a primary cell activated during both the active period and the inactive period.

In some examples of the method, network entities, and non-transitory computer-readable medium described herein, communicating, during the first portion of the active period, via the primary cell or the secondary cell in accordance with the resource allocation associated with the discontinuous operation and communicating, during the second portion of active period and the inactive period, via the primary cell in accordance with the resource allocation associated with the discontinuous operation.

In some examples of the method, network entities, and non-transitory computer-readable medium described herein, communication of the one or more signals may be restricted from the secondary cell in accordance with the resource allocation associated with the discontinuous operation.

Some examples of the method, network entities, and non-transitory computer-readable medium described herein may further include operations, features, means, or instructions for transmitting, via the one or more control messages, an indication that the first frequency band may be configured as a first bandwidth part activated during a first portion of the active period and deactivated during a second portion of the active period and the inactive period and transmitting, via the one or more control messages, an indication that the second frequency band may be configured as a second bandwidth part activated during a second portion of the active period and the inactive period and deactivated during the first portion of the active period.

In some examples of the method, network entities, and non-transitory computer-readable medium described herein, communicating, during the first portion of the active period, via the first bandwidth part in accordance with the resource allocation associated with the discontinuous operation and communicating, during the second portion of the active period and the inactive period, via the second bandwidth part in accordance with the resource allocation associated with the discontinuous operation.

In some examples of the method, network entities, and non-transitory computer-readable medium described herein, the second bandwidth part may be smaller than the first bandwidth part, the first bandwidth part overlaps at least partially with the second bandwidth part, and communication of the one or more signals may be restricted to the second bandwidth part when the first bandwidth may be activated and when the first bandwidth part may be deactivated in accordance with the resource allocation associated with the discontinuous operation.

Some examples of the method, network entities, and non-transitory computer-readable medium described herein may further include operations, features, means, or instructions for transmitting, via the one or more control messages, an indication that the first frequency band may be configured as a first bandwidth part activated during the active period and deactivated during the inactive period and transmitting, via the one or more control messages, an indication that the second frequency band may be configured as a second bandwidth part activated during the inactive period and deactivated during the active period.

In some examples of the method, network entities, and non-transitory computer-readable medium described herein, communicating, during a first portion of the active period, via the first bandwidth part in accordance with the resource allocation associated with the discontinuous operation, communicating, during a second portion of the active period, via a subset of the first bandwidth part in accordance with the resource allocation associated with the discontinuous operation, and communicating, during the inactive period, via the second bandwidth part in accordance with the resource allocation associated with the discontinuous operation.

In some examples of the method, network entities, and non-transitory computer-readable medium described herein, the second bandwidth part may be smaller than the first bandwidth part, the first bandwidth part overlaps at least partially with the second bandwidth part, the subset of the first bandwidth part may be reserved for one or more second signals communicated between a second UE and the second cell, and communication of the one or more signals may be restricted to the second bandwidth part when the first bandwidth may be activated and when the first bandwidth part may be deactivated in accordance with the resource allocation associated with the discontinuous operation.

In some examples of the method, network entities, and non-transitory computer-readable medium described herein, communicating, during an extension of the active period, via the second frequency band in accordance with the resource allocation associated with the discontinuous operation.

In some examples of the method, network entities, and non-transitory computer-readable medium described herein, during the extension of the active period, communication to or from the UE may be restricted to the second frequency band in accordance with the resource allocation associated with the discontinuous operation.

Some examples of the method, network entities, and non-transitory computer-readable medium described herein may further include operations, features, means, or instructions for receiving a report indicating a capability of the UE to support the resource allocation associated with the discontinuous operation, where the resource allocation may be in association with the serving cell of the UE being a first NTN cell and the second cell being a second NTN cell.

Some examples of the method, network entities, and non-transitory computer-readable medium described herein may further include operations, features, means, or instructions for receiving a first report indicating a first capability of the UE to support the resource allocation associated with the discontinuous operation, where the resource allocation may be in association with the serving cell of the UE being an NTN cell and receiving a second report indicating a second capability of the UE to support the resource allocation associated with the discontinuous operation, where the resource allocation may be in association with the serving cell of the UE being a terrestrial network cell.

Some examples of the method, network entities, and non-transitory computer-readable medium described herein may further include operations, features, means, or instructions for transmitting an indication of ephemeris information associated with one or more cells adjacent to the serving cell, where the serving cell may be an NTN cell and the one or more cells adjacent to the serving cell may be one or more other NTN cells.

Some examples of the method, network entities, and non-transitory computer-readable medium described herein may further include operations, features, means, or instructions for transmitting an activation or deactivation message associated with the discontinuous operation.

In some examples of the method, network entities, and non-transitory computer-readable medium described herein, the resource allocation may be in association with the at least one NTN cell and at least one terrestrial network cell each serving the coverage area including the UE.

Some examples of the method, network entities, and non-transitory computer-readable medium described herein may further include operations, features, means, or instructions for transmitting one or more first signals via the at least one NTN cell, transmitting one or more second signals via the at least one terrestrial network cell, and receiving a report of a first propagation delay, a second propagation delay, or both.

In some examples of the method, network entities, and non-transitory computer-readable medium described herein, the network entity may be associated with the at least one terrestrial network cell and the method, apparatuses, and non-transitory computer-readable medium may include further operations, features, means, or instructions for receiving an indication of ephemeris information from the at least one NTN cell and estimating, at the at least one terrestrial network cell, an average propagation delay between the UE and the at least one NTN cell.

Some examples of the method, network entities, and non-transitory computer-readable medium described herein may further include operations, features, means, or instructions for transmitting ephemeris information associated with the at least one NTN cell via an NTN configuration information element associated with the at least one NTN cell.

In some examples of the method, network entities, and non-transitory computer-readable medium described herein, the one or more signals may be restricted to the second frequency band in accordance with the resource allocation associated with the discontinuous operation and the second frequency band may be smaller than the first frequency band.

In some examples of the method, network entities, and non-transitory computer-readable medium described herein, the resource allocation allocates the first frequency band to the UE during active periods associated with the discontinuous operation and allocates the second frequency band to the UE during inactive periods associated with the discontinuous operation.

In some examples of the method, network entities, and non-transitory computer-readable medium described herein, at least a portion of the first frequency band may be non-overlapping with the second frequency band.

In some examples of the method, network entities, and non-transitory computer-readable medium described herein, the at least one NTN cell includes the serving cell of the UE, the second cell, or both and the second cell may be a neighbor cell to the serving cell of the UE.

BRIEF DESCRIPTION OF THE DRAWINGS

FIGS. 16 and 17 show flowcharts illustrating methods that support NTN discontinuous operation coexistence in accordance with one or more aspects of the present disclosure.

DETAILED DESCRIPTION

Figure 1:
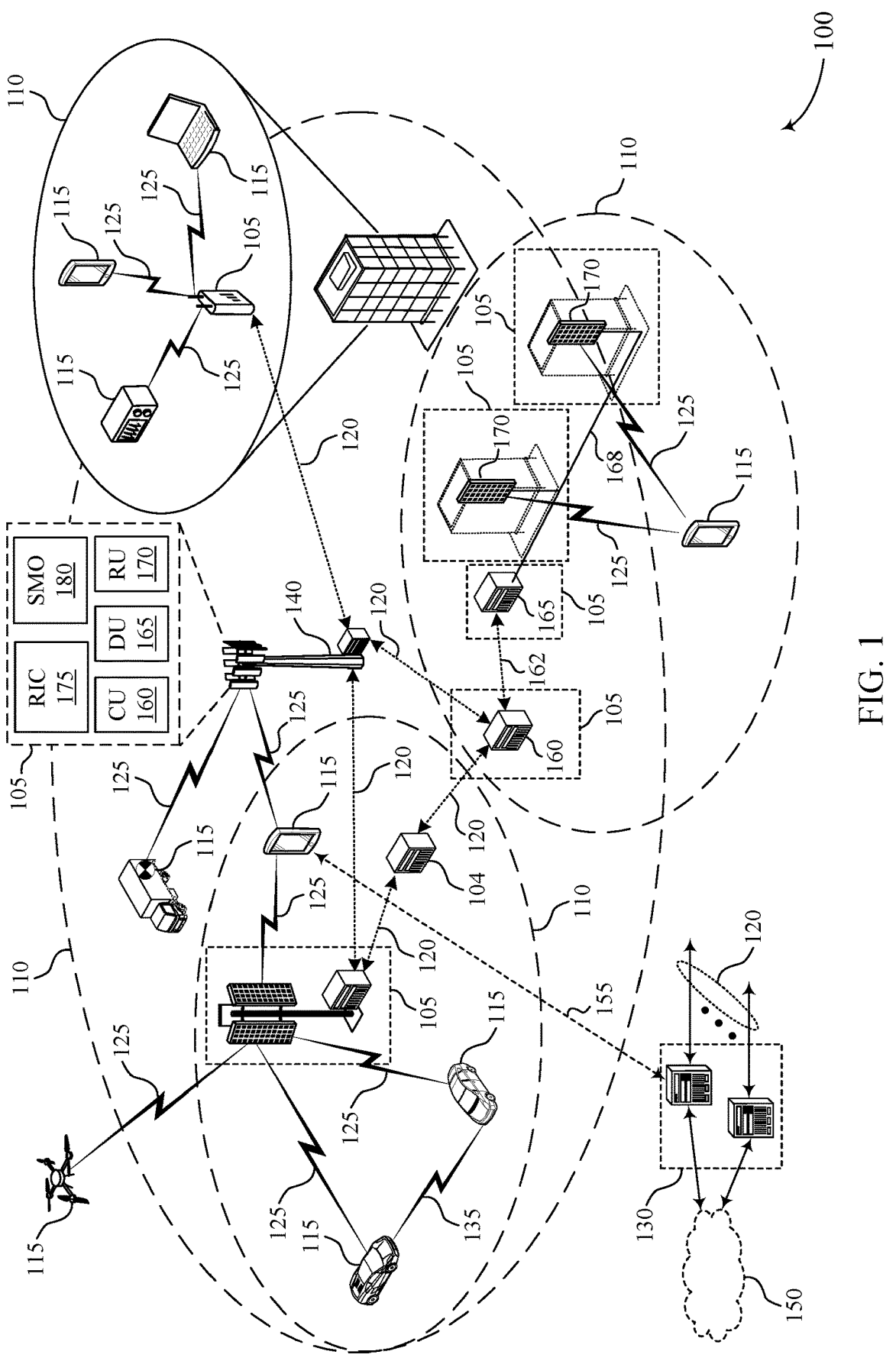
FIGS. 1 and 2 show examples of wireless communications systems that support non-terrestrial network (NTN) discontinuous operation coexistence in accordance with one or more aspects of the present disclosure.

A non-terrestrial network (NTN) may be associated with (e.g., provide coverage to) a service area including a set of sub-areas each served by a respective beam of the NTN. For example, a satellite may provide coverage to the service area including the set of sub-areas, and the satellite may communicate with devices in each sub-area using different directional communication beams. As described herein, such a sub-area of an NTN service area may correspond to or otherwise be associated with an NTN cell. In some cases, a satellite may use different frequency bands with a frequency reuse factor greater than one for neighboring cells to avoid inter-cell or inter-beam interference. A terrestrial network (TN) may coexist with the NTN via an orthogonal resource allocation (e.g., time division multiplexing (TDM) or frequency division multiplexing (FDM) pattern) to avoid interference. A cell of the NTN, TN, or both may perform discontinuous operations (e.g., discontinuous reception (DRX), discontinuous transmission (DTX), or both) for network energy saving (NES). For example, a user equipment (UE) in a cell may receive and/or transmit signaling during an active period of the discontinuous operation and may refrain from receiving and/or transmitting (e.g., turn off) during a non-active period of the discontinuous operation. Discontinuous operations may be applied per cell, including in deployments involving multiple neighboring NTN cells and deployments including at least one NTN cell and a TN cell. In either of such deployments, resource utilization and system throughput may be limited if active and non-active time durations associated with discontinuous operations across multiple neighboring cells are not considered when determining or selecting resource allocations.

As described herein, an NTN, a TN, or both may determine (such as identify or select) and transmit information indicative of a flexible resource allocation configuration for a discontinuous operation in which different resources may be used at different times in accordance with how discontinuous operations at two neighboring cells (such as two NTN cells, or an NTN cell and a TN cell) compare. For example, the flexible resource allocation may indicate time-varying frequency resource allocations to a UE, and such frequency resource allocations may vary based on whether discontinuous operation at two or more cells overlap. For example, an active duration of a first serving cell may overlap with a non-active duration of a second serving cell. In accordance with a frequency division multiplexing (FDM) scheme, the first serving cell may communicate using a first frequency band by default and the second serving cell may communicate using a second frequency band by default.

Accordingly, in accordance with the active duration of the first serving cell overlapping with the non-active duration of the second serving cell, a first UE served by the first serving cell may receive information indicative of a first resource allocation that allocates the first frequency band and the second frequency band during the active duration of the first serving cell (e.g., the non-active duration of the second serving cell), as the second frequency band may be largely unused by the second serving cell during the non-active duration of the second serving cell. In other words, during the active duration of the first serving cell of the first UE, the first UE may be allocated resources from any of the first frequency band and the second frequency band in accordance with the active duration of the first serving cell overlapping with the non-active duration of the second serving cell. A network entity may coordinate or observe discontinuous operation at each of multiple cells to determine respective flexible resource allocation configurations for respective UEs. A flexible resource allocation configuration may indicate resource allocations by one or more component carriers (CCs) or bandwidth parts (BWPs).

Further, the flexible resource allocation may restrict some signals (e.g., a synchronization signal block (SSB), a system information block (SIB), a random access channel (RACH) message, a periodic channel state information (CSI) reference signal (CSI-RS), a periodic sounding reference signal (SRS), etc.), which may be received or transmitted by a UE during both an active and a non-active duration of discontinuous operations, to a smaller set of frequency resources. For example, in the context of the first UE discussed above, such restricted signals may be restricted to the first frequency band (e.g., a default frequency band associated with the first serving cell) in both active and non-active durations. In some aspects, an NTN or TN may reserve a set of resources via which a UE may monitor for and/or transmit the restricted signals during a non-active duration of the discontinuous operations, as those resources may be used by another UE (e.g., another UE having an active duration overlapping the non-active duration of the UE) in accordance with flexible resource allocation configurations.

Aspects of the disclosure are initially described in the context of wireless communications systems. Aspects of the disclosure are also described in the context of resource allocation diagrams and process flows. Aspects of the disclosure are further illustrated by and described with reference to apparatus diagrams, system diagrams, and flowcharts that relate to NTN discontinuous operation coexistence.

FIG. 1 shows an example of a wireless communications system 100 that supports NTN discontinuous operation coexistence in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support NTN discontinuous operation coexistence as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

As described herein, the UE 115 may receive one or more control messages including information indicative of a resource allocation associated with a discontinuous operation at a serving cell of the UE 115. The resource allocation may further be associated with at least one NTN cell serving a coverage area (e.g., the coverage area 110) including the UE 115. The UE 115 may communicate, during an active period associated with the discontinuous operation at the serving cell, one or more data messages via first frequency resources of a first frequency band in accordance with the resource allocation associated with the discontinuous operation. The active period at the serving cell may be non-overlapping with a second active period associated with a second discontinuous operation at a second cell. The UE 115 may communicate, during an inactive period associated with the discontinuous operation at the serving cell, one or more signals via second frequency resources of a second frequency band in accordance with the resource allocation associated with the discontinuous operation.

Figure 2:
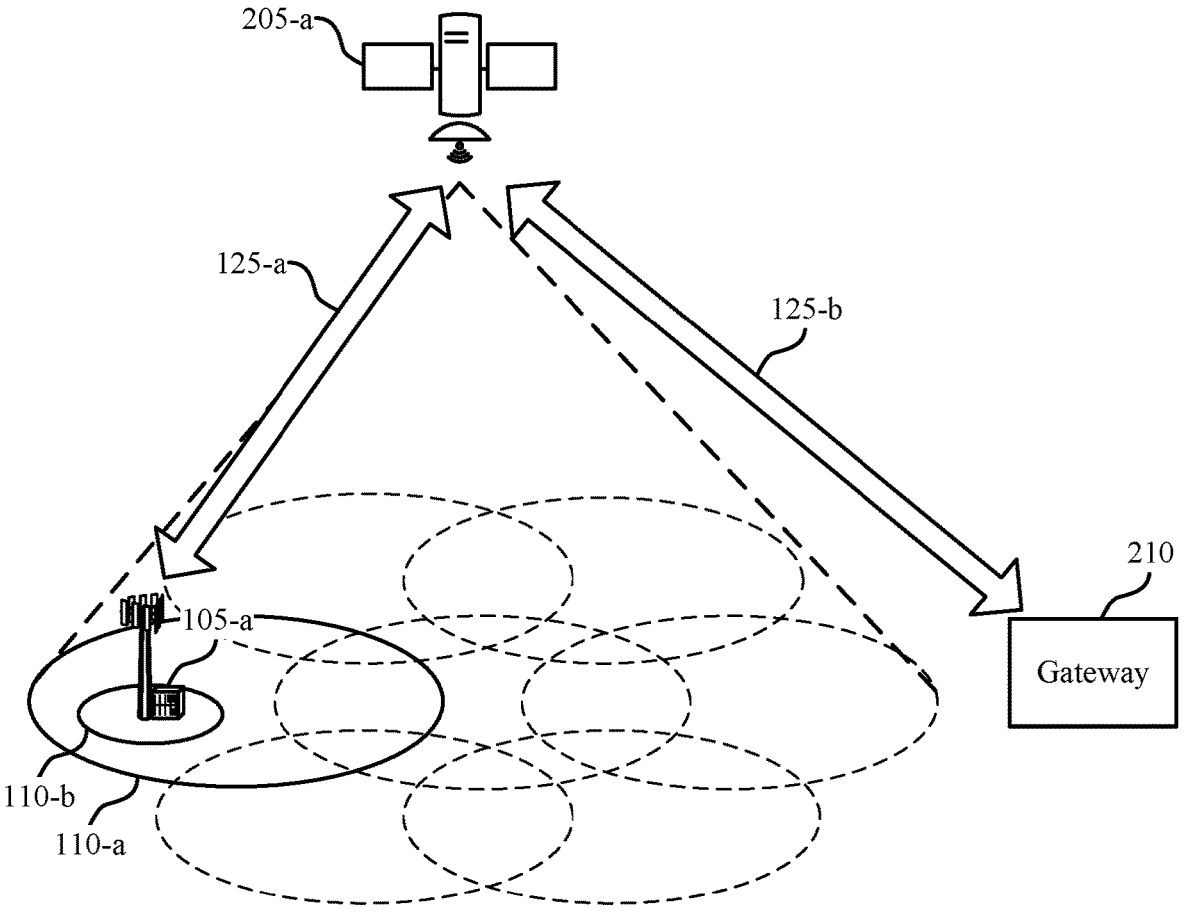

FIG. 2 shows an example of a wireless communications system 200 that supports NTN discontinuous operation coexistence in accordance with one or more aspects of the present disclosure. The wireless communications system 200 may implement or be implemented by various aspects of the wireless communications system 100. For example, the wireless communications system 200 may include a network entity 105-a, a coverage area 110-a, a coverage area 110-b, a communication link 125-a, and a communication link 125-b, which may represent examples of corresponding devices as described with reference to FIG. 1.

In some examples, the wireless communications system may include an NTN, a TN, or both. For example, the wireless communications system may include the NTN having a satellite 205-a (which also may be an example of or referred to as a network entity 105 as illustrated by and described with reference to FIG. 1) serving a service area divided into one or more (e.g., hundreds) of sub-areas. The satellite 205-*a* may serve the one or more sub-areas via individual beams. That is, the satellite 205-*a* may serve a first sub-area with a first beam (or at least one beam from a first set of beams), a second sub-area with a second beam (or at least one beam from a second set of beams), and so on.

The satellite 205-*a* may relay communications between a gateway 210 (which also may be an example of or referred to as a network entity 105 as illustrated by and described with reference to FIG. 1) and one or more devices in the service area. For example, the gateway 210 may transmit one or more signals to the satellite 205-*a* via the communication link 125-*b*, which may be an example of a feeder link, and the satellite 205-*a* may relay the one or more signals to a receiving device via the communication link 125-*a*. Additionally, or alternatively, the satellite 205-*a* may perform beamforming using one or more antenna arrays, a frequency band conversion between the communication link 125-*b* (e.g., the feeder link) and the communication link 125-*a* (e.g., a service link), or both.

Each of the one or more sub-areas may correspond to a frequency band. For example, a first sub-area may use a first frequency band, a second sub-area may use a second frequency band, and so on, and the first frequency band and the second frequency band may be non-overlapping. The first frequency band and the second frequency band may be non-overlapping to mitigate inter-cell interference, beam interference, or both. In some cases, the first sub-area and the second sub-area may be neighboring cells. The satellite 205-*a* may apply a frequency reuse factor (e.g., a frequency reuse factor greater than one) to the neighboring cells to mitigate interference and reduce an overall quantity of different frequency bands. For example, the satellite 205-*a* may use a same frequency band for two different sub-areas in the service area, as long as the two different sub-areas are separated by at least one other sub-area.

Additionally, or alternatively, the wireless communications system 200 may include the TN having the network entity 105-*a* serving the coverage area 110-*b*. In some examples, the coverage area 110-*b* and the coverage area 110-*a* (e.g., of the satellite 205-*a*) may be overlapping. For example, the coverage area 110-*b* may be within the coverage area 110-*a*, or, the coverage area 110-*a* may include at least a portion of the coverage area 110-*b* (e.g., partially overlapping). In some examples, a UE 115 (not shown) in the overlapping coverage areas and one or more network entities 105 (such as the network entity 105-*a*, the satellite 205-*a*, the gateway 210, or any combination thereof) may support dual connectivity. For example, the UE 115 and one or more network entities may communicate via two or more NTNs (e.g., NTN-NTN dual connectivity), two or more TNs, or a combination (e.g., NTN-TN dual connectivity). In such examples, the UE 115 may receive an orthogonal resource allocation (e.g., a frequency division multiplexing (FDM) pattern, a time division multiplexing pattern (TDM), or both) to avoid interference (e.g., inter-cell interference).

In some cases, an NTN cell, a TN cell, or both, may support discontinuous operations for network energy saving (NES). For example, a first cell (e.g., the NTN cell or the TN cell) may communicate according to a pattern configuration including a discontinuous period (e.g., DTX or DRX period) having an active period (e.g., an "on" period) and an inactive period (e.g., a "non-active" or "off" period). In some cases, the pattern configuration may also include a start offset. A UE 115 of the first cell may receive signaling indicating the pattern configuration. For example, the UE 115 may be an RRC-connected UE, and the signaling may be UE-specific RRC signaling. In such examples, RRC signaling may (e.g., implicitly) activate and/or deactivate discontinuous operations at the first cell. For example, after receiving RRC signaling configuring the discontinuous operations, discontinuous operations may activate, and after release of the RRC configuration, the discontinuous operations may deactivate.

In some examples, one or more UEs 115 in the first cell may receive common signaling via physical downlink control channel (PDCCH) signaling for discontinuous operation activation and deactivation (e.g., without hybrid automatic repeat request (HARQ) feedback). The UE 115 (e.g., the RRC-connected UE) may perform random access channel (RACH) transmissions and receive system information blocks (SIBs) during a non-active period of the discontinuous operations for the cell.

An NTN, a TN, or both may configure discontinuous operations per-cell (e.g., for NES). For example, one or more network entities (e.g., controlling or operating one or both of an NTN or a TN) may configure a first discontinuous operation for a first cell, a second discontinuous operation for a second cell, and so on. However, the one or more network entities may limit resource utilization and system throughput when allocating resources to each cell if the one or more network entities are unable to consider the respective discontinuous operations at each of various cells in a given coverage area (e.g., if the one or more network entities are unable to consider overlapping active or inactive periods of neighboring cells).

To improve resource utilization and system throughput, a network entity 105 (e.g., the network entity 105-*a* and/or the satellite 205-*a*) may transmit, to a UE 115, one or more control messages including information indicative of a resource allocation associated with a discontinuous operation at a serving cell of the UE 115 (e.g., a serving cell corresponding to the coverage area 110-*a* or the coverage area 110-*b*). The resource allocation may be associated with at least one NTN cell serving a coverage area (e.g., the coverage area 110-*a*) including the UE 115. The UE 115 may communicate, during an active period associated with the discontinuous operation at the serving cell, one or more data messages via first frequency resources of a first frequency band in accordance with the resource allocation associated with the discontinuous operation. The active period at the serving cell may be non-overlapping with a second active period associated with a second discontinuous operation at a second cell. The UE 115 may communicate, during an inactive period associated with the discontinuous operation at the serving cell, one or more signals via second frequency resources of a second frequency band in accordance with the resource allocation associated with the discontinuous operation.

Figure 3:
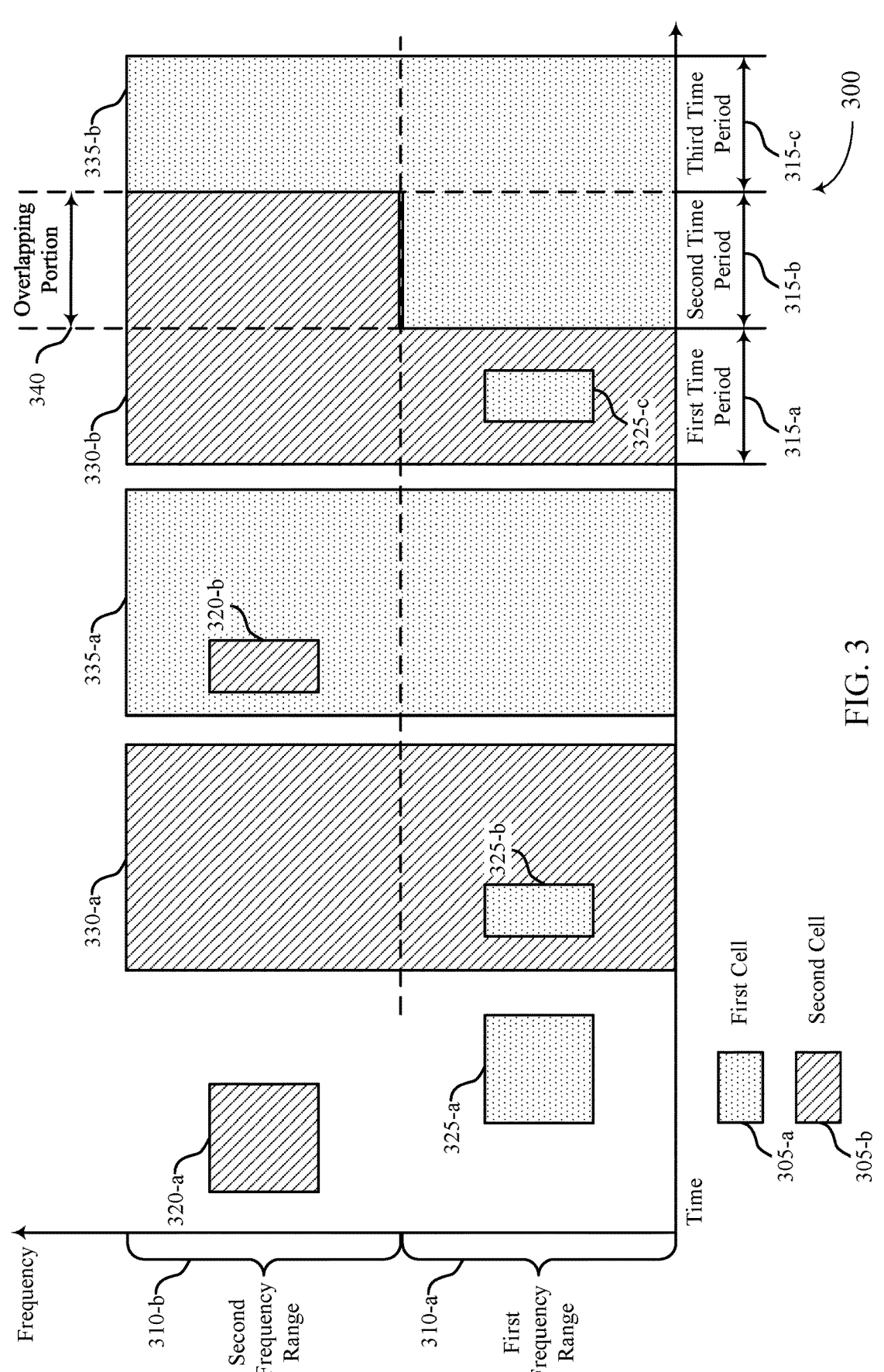
FIGS. 3 through 6 show examples of resource allocation diagrams that support NTN discontinuous operation coexistence in accordance with one or more aspects of the present disclosure.

FIG. 3 shows an example of a resource allocation diagram 300 that supports NTN discontinuous operation coexistence in accordance with one or more aspects of the present disclosure. The resource allocation diagram 300 may implement or be implemented by various aspects of the wireless communications system 100, the wireless communications system 200, or both. For example, the resource allocation diagram 300 may be implemented by a network entity, an NTN device, one or more UEs, or a combination thereof which may represent examples of corresponding devices as described with reference to FIGS. 1 and 2.

The resource allocation diagram 300 may represent resource allocations for a first cell 305-*a* and a second cell 305-*b*. In some examples, the first cell 305-*a* and the second cell 305-*b* may be neighboring cells (e.g., adjacent cells, including cells that would use different frequency bands in accordance with a frequency reuse factor of greater than one). The first cell 305-*a* and the second cell 305-*b* may be NTN cells, TN cells, or any combination thereof. For example, the resource allocation diagram 300 may represent coexistence for an NTN and a TN (e.g., NTN-TN coexistence), or coexistence for a NTN and another NTN (e.g., NTN-NTN coexistence).

In some cases, the first cell 305-*a* may serve one or more first UEs 115 and the second cell 305-*b* may serve one or more second UEs 115. The one or more first UEs, the one or more second UEs, or both may be RRC-connected UEs 115.

In some examples, a network entity 105 may be associated with the first cell 305-*a* or the second cell 305-*b*. The network entity 105 may transmit an indication of a resource allocation to the one or more first UEs 115 or the one or more second UEs 115 according to discontinuous operations of the first cell 305-*a* and the second cell 305-*b*. As such, the network entity 105 may allocate resources for coexisting cells with discontinuous operations in order to improve resource utilization and system throughput. In some implementations, the network entity 105 may transmit information indicative of a first resource allocation to the UEs 115 of the first cell 305-*a* and may transmit information indicative of a second resource allocation to the UEs 115 of the second cell 305-*b*. In some other implementations, the network entity 105 may transmit information indicative of resource allocations for both the first cell 305-*a* and the second cell 305-*b* to all UEs 115 in a coverage area and each UE 115 may identify, ascertain, or otherwise determine which resources are relevant to that UE 115 in accordance with which of the first cell 305-*a* or the second cell 305-*b* that UE 115 communicates with.

In accordance with the resource allocation(s) configured, selected, or otherwise determined by the network entity 105 in accordance with discontinuous operation at each of the first cell 305-*a* and the second cell 305-*b*, the first cell 305-*a* and the second cell 305-*b* may share a frequency band including a first frequency range 310-*a* and a second frequency range 310-*b* (e.g., contiguous frequency ranges in the example of FIG. 3). In some examples, the resource allocation(s) may indicate that the first cell 305-*a* is to transmit or receive SSBs, SIBs, RACH messages, or the like in the first frequency range 310-*a* and that the second cell 305-*b* is to transmit or receive SSBs, SIBs, RACH messages, or the like in the second frequency range 310-*b*. For example, the first cell 305-*a* may communicate SSBs, SIBs, or RACH messages via the resource 325-*a* while the second cell may communicate SSBs, SIBs, paging, RACH messages, or periodic reference signals (including periodic CSI-RS, SRS, positioning reference signal (PRS), etc.) via the resource 320-*a*. In some aspects, the resource 320-*a* and the resource 325-*a* may be understood as reserved resources, such as resources that are reserved for some specific signaling or messaging. In other words, for NTN adjacent cells, some channels or signals (e.g., SSB, SIB, RACH, or the like), which can be transmitted or received in active and non-active time of cell DTX/DRX, may be transmitted in different frequency resources. As such, during a cell DRX/DTX active time, the resources to transmit SSB, SIB, RACH, or the like of a neighbor cell may be reserved.

During active time periods of the first cell 305-*a* that do not overlap active time periods of the second cell 305-*b*, the one or more first UEs 115 of the first cell 305-*a* may transmit or receive signals via the first frequency range 310-*a* and the second frequency range 310-*b*. That is, during an active period 335-*a* of the first cell 305-*a*, the first frequency range 310-*a* and the second frequency range 310-*b* (e.g., the entire shared frequency band) may be used by the first cell 305-*a*.

Similarly, during active time periods of the second cell 305-*b* that do not overlap active time periods of the first cell 305-*a*, the one or more second UEs 115 of the second cell 305-*b* may transmit or receive signals via the first frequency range 310-*a* and the second frequency range 310-*b*. That is, during an active period 330-*a* of the second cell 305-*b*, the first frequency range 310-*a* and the second frequency range 310-*b* (e.g., the entire shared frequency band) may be used by the second cell 305-*b*.

In some examples, the resource allocation(s) may include one or more resources reserved for transmission of SSB, SIB, paging, RACH messages, or periodic reference signals. That is, the resource allocation may include reserved resources for messages which may be transmitted outside of an active period of a cell. For example, the active period 330-*a* of the second cell 305-*b* may include a reserved resource 325-*b* of the first frequency range 310-*a* in which the first cell 305-*a* may communicate SSB, SIB, paging, RACH messages, or periodic reference signals. Additionally, or alternatively, the active period 335-*a* of the first cell 305-*a* may include a reserved resource 320-*b* in which the second cell 305-*b* may communicate SSB, SIB, paging, RACH messages, or periodic reference signals.

The active periods of the first cell 305-*a* and the second cell 305-*b* may overlap. For example, an active period 330-*b* of the second cell 305-*b* may overlap, during an overlapping portion 340, an active period 335-*b* of the first cell 305-*a*. In a first time period 315-*a* in which the active period 330-*b* may not yet be overlapping the active period 335-*b*, the second cell 305-*b* may use the shared frequency range (e.g., the first frequency range 310-*a* and the second frequency range 310-*b*), and a resource 325-*c* may be reserved for communication of one or more SSBs, one or more SIBs, paging, RACH messages, or periodic reference signals by the first cell 305-*a*. Similarly, after the overlapping portion 340 and during a third time period 315-*c*, the first cell 305-*a* may use the shared frequency range (e.g., the first frequency range 310-*a* and the second frequency range 310-*b*).

In a second time period 315-*b* corresponding to the overlapping portion 340 of the active period 330-*b* of the second cell 305-*b* and the active period 335-*b* of the first cell, the first cell 305-*a* and the second cell 305-*b* may use orthogonal frequency resources. For example, during the second time period 315-*b*, the first cell 305-*a* may use the first frequency range 310-*a* while the second cell 305-*b* may use the second frequency range 310-*b*. In some examples, the first cell 305-*a* and the second cell 305-*b* may use separate frequency resources during overlapping active periods (e.g., the overlapping portion 340) to avoid interference.

For example, during time periods in which both the first cell 305-*a* and the second cell 305-*b* are in an active DRX/DTX mode (e.g., DRX/DTX active), the first cell 305-*a* and the second cell 305-*b*, in accordance with respectively configured resource allocations, may fall back, revert, or update to a default frequency allocation that is associated with FDM operation between the first cell 305-*a* and the second cell 305-*b* (in accordance with at least one of the first cell 305-*a* and the second cell 305-*b* being an NTN cell). In other words, if the partial cell DRX/DTX active times of adjacent cells are overlapping, the channels or signals in the overlapped cell DRX/DTX active time may not be transmitted in the shared frequency resources and may instead be limited in the band same as that of cell DRX/DTX non-active time to avoid interference.

Figure 4:
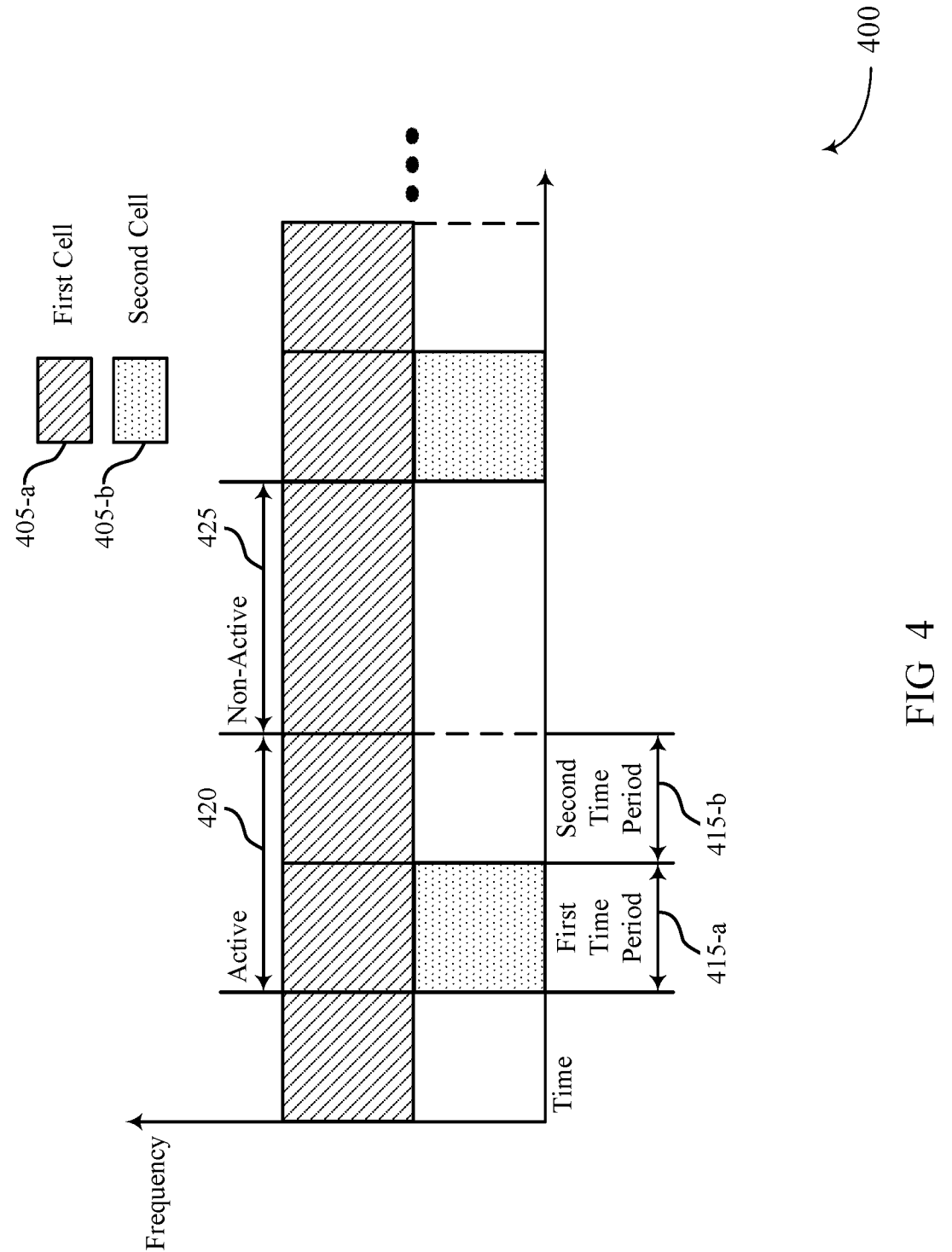

FIG. 4 shows an example of a resource allocation diagram 400 that supports NTN discontinuous operation coexistence in accordance with one or more aspects of the present disclosure. The resource allocation diagram 400 may implement or be implemented by various aspects of the wireless communications system 100, the wireless communications system 200, or both. For example, the resource allocation diagram 400 may be implemented by a network entity, an NTN device, one or more UEs, or a combination thereof which may represent examples of corresponding devices as described with reference to FIGS. 1 and 2.

The resource allocation diagram 400 may represent resource allocations for a first cell 405-a and a second cell 405-b. In some examples, the first cell 405-a and the second cell 405-b may be neighboring cells (e.g., adjacent cells). The first cell 405-a and the second cell 405-b may be NTN cells, TN cells, or any combination thereof. For example, the resource allocation diagram 400 may represent coexistence for a NTN and a TN (e.g., NTN-TN coexistence), or, coexistence for a NTN and another NTN (e.g., NTN-NTN coexistence). The first cell 405-a and the second cell 405-b may be examples of the first cell 305-a and the second cell 305-b, respectively, as described with reference to FIG. 3.

In some cases, the first cell 405-a may serve one or more first UEs 115 and the second cell 405-b may serve one or more second UEs 115. The one or more first UEs 115, the one or more second UEs 115, or both may be RRC-connected UEs. The one or more first UEs 115, the one or more second UEs 115, or both may receive an indication of a resource allocation via one or more RRC messages (e.g., unicast RRC signaling), one or more MAC control element (MAC-CE) messages, L1 signaling, or any combination thereof.

In some examples, for a first UE 115 served by the first cell 405-a, the first cell 405-a may be configured (via the resource allocation) as a first cell or a primary cell (PCell) and the second cell 405-b may be configured as a secondary cell (SCell). In other words, different component carriers (CCs) may be used during different cell DRX/DTX active durations. In such examples, the first cell 405-a may be active for all time (e.g., including an active period 420 and a non-active period 425 of a discontinuous operation at the first cell 405-a). Additionally, or alternatively, the second cell 405-b may be active for a portion of the active period 420 of the discontinuous operation at the first cell 405-a. For example, the second cell 405-b may be activated in a first time period 415-a of the active period 420 but deactivated in a second time period 415-b of the active period 420. In other words, a flexible resource allocation configuration generated in accordance with discontinuous operation at multiple neighboring cells may specify or indicate time-changing resource allocations associated with a serving cell in terms of SCell activation and deactivation, or dormancy, with the PCell being associated with a second frequency band and the SCell being associated with a first frequency band. In some examples, a cell switching time may be needed when switching between different active periods for SCell (such as when switching between different cell DRX/DTX active durations).

In some implementations, some signals may be restricted to the first cell 405-a (even when the SCell (the second cell 405-b) is active). For example, SSBs, SIBs, paging messages, RACH messages, periodic reference signals (RSs) (such as CSI-RS, SRS, PRS, etc.), or the like, which may be communicated in active and non-active durations of cell DTX/DRX, may not be transmitted or received in the second cell 405-b (and instead may be restricted to the first cell 405-a) regardless of whether the SCell is active or non-active. In other words, SSBs, SIBs, paging messages, RACH messages, periodic RSs, or the like may not be allowed to be communicated via frequency resources of the SCell regardless of whether the discontinuous operation at the SCell is active or non-active. Aperiodic or semi-persistent transmission/reception of CSI-RS, SRS or PRS may be allowed in SCell during the SCell active time.

Figure 5:
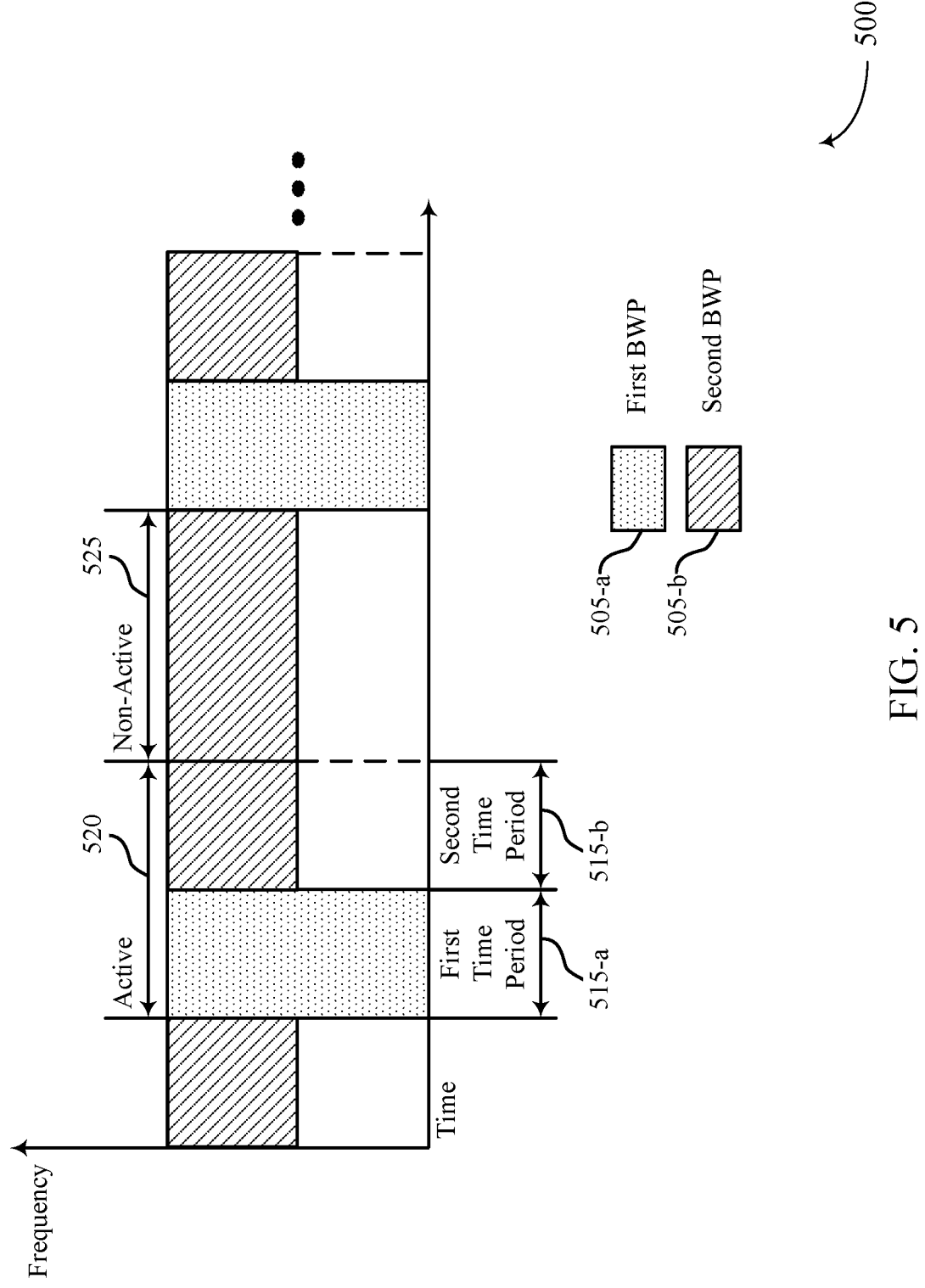

FIG. 5 shows an example of a resource allocation diagram 500 that supports NTN discontinuous operation coexistence in accordance with one or more aspects of the present disclosure. The resource allocation diagram 500 may implement or be implemented by various aspects of the wireless communications system 100, the wireless communications system 200, or both. For example, the resource allocation diagram 500 may be implemented by a network entity, an NTN device, one or more UEs, or a combination thereof which may represent examples of corresponding devices as described with reference to FIGS. 1 and 2.

In some examples, a cell (e.g., an NTN cell or a TN cell) may communicate using different bandwidth parts (BWPs) during different durations of a discontinuous operation of the cell. For example, in accordance with the resource allocation diagram 500, the cell may use a first BWP 505-a during a first time period 515-a of an active period 520, a second BWP 505-b during a second time period 515-b of the active period 520, and the second BWP during a non-active period 525 (e.g., an inactive period). In other words, a flexible resource allocation configuration generated in accordance with discontinuous operation at multiple neighboring cells may specify or indicate time-changing resource allocations associated with a serving cell in terms of BWP, with the first BWP 505-a being associated with a first frequency band and the second BWP 505-b being associated with a second frequency band.

In some cases, a BWP switching time may be included when switching between different active periods. For example, a BWP switching time may be implemented to switch from the second BWP 505-b at the end of the active period 520 to the first BWP 505-a at the beginning of a subsequent active period. In some aspects, any BWP switching scheme can be used, such as BWP activation and deactivation or dormancy via MAC-CE or dynamic BWP switching via a downlink (DL) grant (e.g., downlink control information (DCI) format 1_1/1_2) for a physical downlink shared channel (PDSCH) or via uplink (UL) grant (e.g., DCI format 0_1/0_2) for a physical uplink shared channel (PUSCH).

In some implementations, the first BWP 505-a may be larger than the second BWP 505-b. For example, the second BWP 505-b may be confined within the first BWP 505-a. That is, the first BWP 505-a may include a first bandwidth larger than, and including, a second bandwidth of the second BWP 505-b. In addition, the numerology (such as subcarrier spacing and/or cyclic prefix) of the first BWP 505-a may be configured same or different than that of second BWP 505-b. If same numerology is configured for the first BWP 505-a and the second BWP 505-b, the transmission/reception of the SSB, SIB, paging, RACH messages, or periodic RS in the second BWP 505-b may be kept the same in the first BWP 505-a. Alternatively, the first BWP 505-a may be configured as a virtual BWP, which has frequency resources larger than that of the second BWP 505-b but uses same numerology as that of the second BWP 505-b. The switching time between the virtual BWP and the second BWP 505-b may be zero or up to the UE capability.

One or more channels, one or more signals, or both may be restricted to the second BWP 505-*b* during both the active period 520 and the non-active period 525. For example, a UE 115 of the cell may transmit or receive SSBs, SIBs, paging, RACH messages, periodic RS, or the like using the second BWP 505-*b*, but SSBs, SIBs, paging, RACH messages, periodic RS, or the like may not be transmitted at least in a portion of the frequency resources using the first BWP 505-*a* outside of the frequency range of the second BWP 505-*b* (e.g., regardless of the first BWP 505-*a* being active or inactive).

In some examples, a UE 115 may transmit or receive one or more messages (such as downlink and/or uplink transmissions) during an extension of an active period. For example, during an extension of the active period 520, the UE may transmit or receive one or more retransmissions, HARQ feedback, or the like. For example, if a retransmission timer is running (if connected mode DRX (C-DRX) is configured), the UE 115 may be expected to monitor PDCCH, and it is up to the network on whether to schedule retransmissions out of a cell DTX active period. As such, if the DRX retransmission timer is running, the UE 115 may be expected to monitor PDCCH regardless of the cell DTX. Further, if a downlink grant is received during cell DRX/DTX active time, the UE 115 may follow the grant assignment, including for downlink HARQ feedback.

In some cases, the one or more messages that the UE 115 may communicate during an extension of the active period 520 may be restricted to the second BWP 505-*b* (e.g., a default BWP of the UE 115). In some aspects, the extension of the active period 520 may be understood as an extended active time of cell DRX/DTX. A network entity may switch off a second cell (e.g., an SCell) during the extension of the active period 520. Additionally, or alternatively, the network entity may indicate BWP switching from the first BWP 505-*a* to the second BWP 505-*b* for the extension of the active period 520. Or, the network entity may refrain from indicating BWP switching from the first BWP 505-*a* to the second BWP 505-*b* for the extension of the active period 520, and the UE may communicate via the first BWP 505-*a* during the extension of the active period. In some examples, the network entity 105 may refrain from scheduling transmissions in a portion of the first BWP 505-*a* outside of the frequency range of the second BWP 505-*b* during the extended active time. That is, the network entity may exclusively schedule transmissions in the portion of the first BWP 505-*a* that overlaps the second BWP 505-*b* during the extension of the active period 520. In some implementations, semi-persistent or aperiodic CSI-RS or tracking reference signal (TRS) with a flexible bandwidth smaller than the first BWP 505-*a* may be configured for the UE 115, subject to UE capability. In some implementations, a UE 115 may signal (e.g., transmit an indication of) such a UE capability.

Figure 6:
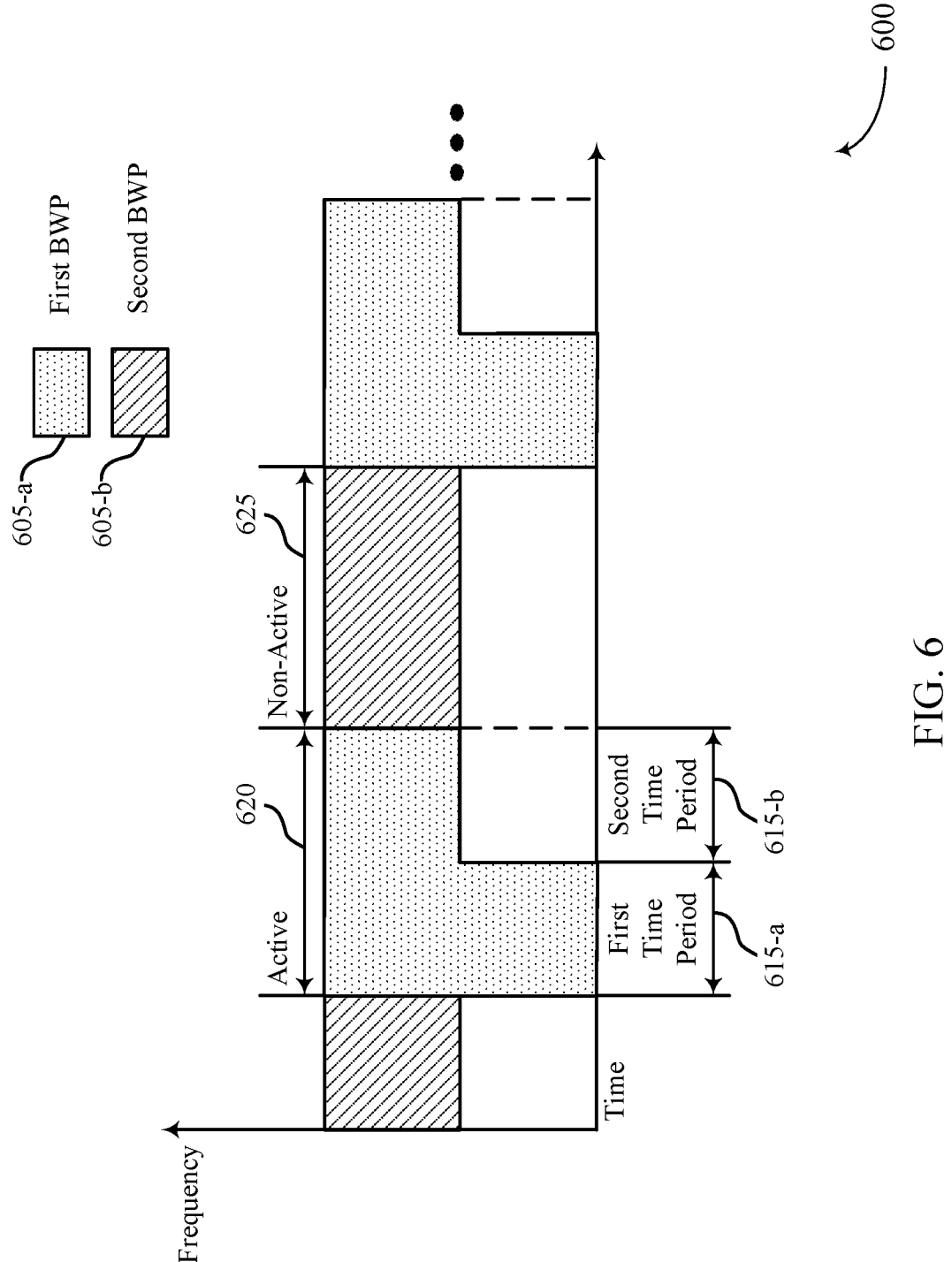

FIG. 6 shows an example of a resource allocation diagram 600 that supports NTN discontinuous operation coexistence in accordance with one or more aspects of the present disclosure. The resource allocation diagram 600 may implement or be implemented by various aspects of the wireless communications system 100, the wireless communications system 200, or both. For example, the resource allocation diagram 600 may be implemented by a network entity, an NTN device, one or more UEs, or a combination thereof which may represent examples of corresponding devices as described with reference to FIGS. 1 and 2.

In some examples, a cell (e.g., an NTN cell or a TN cell) may communicate using different bandwidth parts (BWPs) during different durations of a discontinuous operation of the cell. For example, the cell may use a first BWP 605-*a* during a first time period 615-*a* of an active period 620, a portion of the first BWP 605-*a* during a second time period 615-*b* of the active period 620, and the second BWP during a non-active period 625.

The first BWP 605-*a* may be larger than the second BWP 605-*b*. For example, the second BWP 605-*b* may be confined within the first BWP 605-*a*. That is, the first BWP 605-*a* may include a first bandwidth larger than, and including, a second bandwidth of the second BWP 605-*b*. In other words, a flexible resource allocation configuration generated in accordance with discontinuous operation at multiple neighboring cells may specify or indicate time-changing resource allocations associated with a serving cell in terms of BWP, with the first BWP 605-*a* being associated with a first frequency band and the second BWP 605-*b* being associated with a second frequency band smaller than the first frequency band. In some implementations, the second BWP 605-*b* may be understood, defined, or referred to as a default BWP, such as the same as the BWP that might be otherwise used by the UE 115 in an RRC_IDLE/INACTIVE state. In addition, the numerology (such as subcarrier spacing and/or cyclic prefix) of the first BWP 605-*a* may be configured same or different than that of the second BWP 605-*b*. If same numerology is configured for the first BWP 605-*a* and the second BWP 605-*b*, the transmission/reception of the SSB, SIB, paging, RACH messages, or periodic RS in the second BWP 605-*b* may be kept the same in the first BWP 605-*a*. Alternatively, the first BWP 605-*a* may be configured as a virtual BWP, which has frequency resources larger than that of the second BWP 605-*b* but uses same numerology as that of the second BWP 605-*b*. The switching time between the virtual BWP and the second BWP 605-*b* may be zero or up to the UE capability.

A network entity 105 may refrain from scheduling transmissions (e.g., uplink or downlink transmissions) in the portion of the first BWP 605-*a* outside of (e.g., non-overlapping with) the second BWP 605-*b* during the second time period 615-*b*. That is, while the first BWP 605-*a* may be active during an entirety of the active period 620 (such that the first BWP 605-*a* may be understood as a common BWP used during cell DRX/DTX active durations), transmissions may be restricted to the portion of the first BWP 605-*a* which overlaps the second BWP 605-*b* during the second time period 615-*b*. In some examples, the portion of the first BWP 605-*a* outside of (e.g., non-overlapping with) the second BWP 605-*b* may be used by one or more other UEs 115 of one or more other, neighboring serving cells for transmitting or receiving at least SSBs, SIBs, paging, RACH messages, periodic RS, or the like during the second time period 615-*b*.

In some examples, a BWP switching time may not be included between different cell DRX/DTX active durations (as BWP switching during different cell DRX/DTX active durations may be avoided by using the common BWP during the cell DRX/DTX active duration). As such, BWP switching time may exclusively be needed when switching between cell DRX/DTX active and non-active durations.

In some implementations, one or more channels, one or more signals, or both may be restricted to frequency resources within the second BWP 605-*b* during both the active period 620 and the non-active period 625 in accordance with the flexible resource allocation configuration. For example, a UE 115 of the cell may transmit or receive SSBs, SIBs, paging, RACH messages, periodic RS, or the like using frequency resources that are within the second BWP 605-*b*, and SSBs, SIBs, paging, RACH messages, periodic RS, or the like may not be transmitted or received using frequency resources of the first BWP 605-*a* that do not overlap with the second BWP 605-*b* (e.g., regardless of the first BWP 605-*a* being active or inactive). In some implementations, a semi-persistent or aperiodic CSI-RS or TRS with a flexible bandwidth smaller than the first BWP 605-*a* may be configured for the UE 115, subject to UE capability. In some implementations, a UE 115 may signal (e.g., transmit an indication of) such a UE capability.

Figure 7:
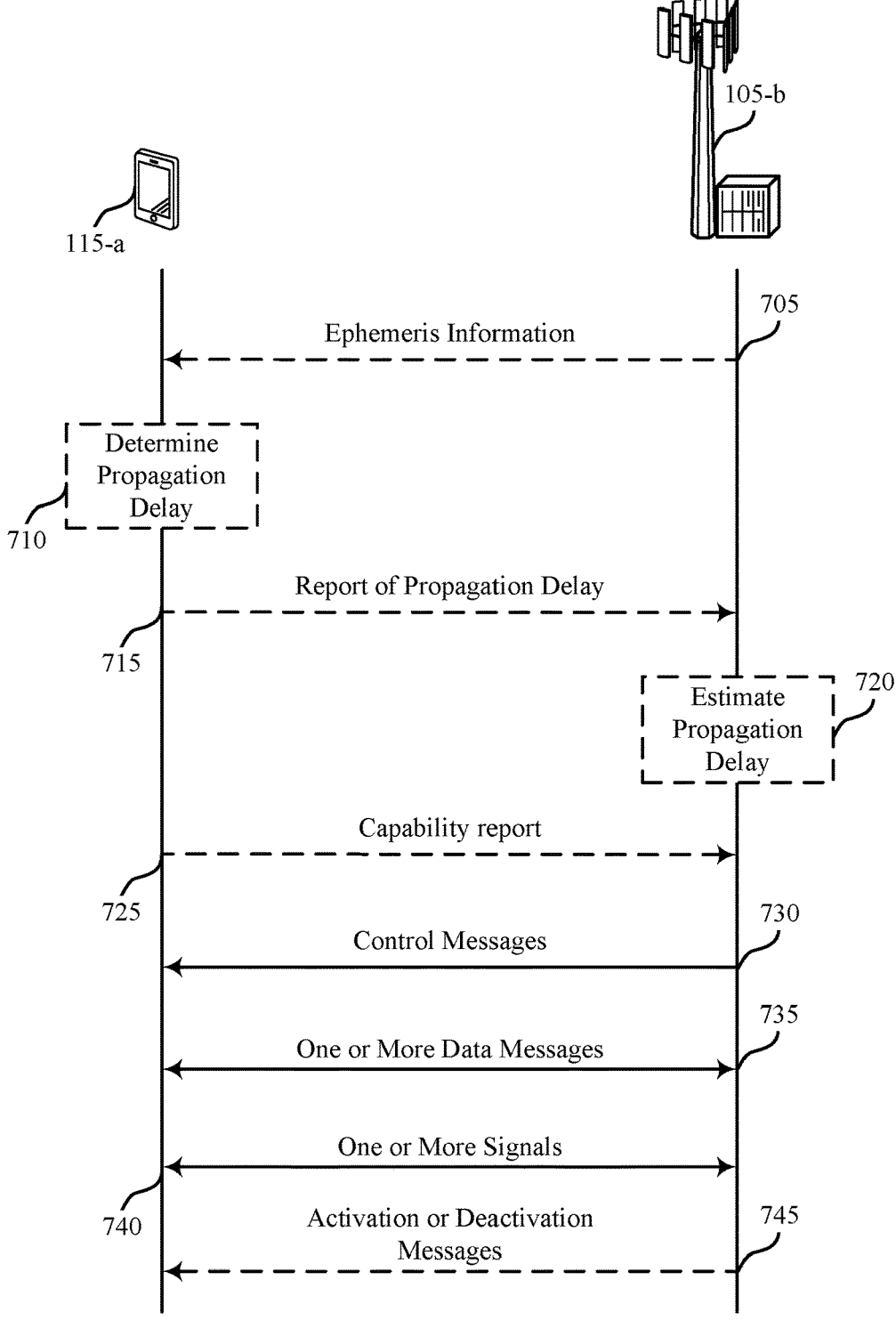
FIG. 7 shows an example of a process flow that supports NTN discontinuous operation coexistence in accordance with one or more aspects of the present disclosure.

FIG. 7 shows an example of a process flow 700 that supports NTN discontinuous operation coexistence in accordance with one or more aspects of the present disclosure. In some examples, the process flow 700 may implement or be implemented by aspects of the wireless communications system 100, the wireless communications system 200, and the resource allocation diagrams 300, 400, 500, and 600 as described with reference to FIGS. 1-6. For example, the process flow 700 may include a network entity 105-*b* and a UE 115-*a*, which may be examples of corresponding devices as described with reference to FIGS. 1 and 2.

Alternative examples of the following may be implemented, where some steps are performed in a different order than described or are not performed at all. In some cases, steps may include additional features not mentioned below, or further steps may be added. Although the network entity 105-*b* and the UE 115-*a* are shown performing the operations of the process flow 700, some aspects of some operations may also be performed by one or more other wireless devices (such as by multiple network entities 105, or in accordance with coordination among multiple network entities 105).

In some examples, the UE 115-*a* may be with in coverage of a first NTN cell neighboring a second NTN cell. A first satellite may serve the first NTN cell and the second NTN cell (e.g., intra-satellite cells). In such cases, a downlink slot boundary of the UE 115-*a* may be aligned based on the propagation delay for the first NTN cell and the second NTN cell being the same. However, in some other examples, a first satellite may serve the first NTN cell while a second satellite serves the second NTN cell (e.g., inter-satellite cells). In such examples, the downlink slot boundary of the UE 115-*a* may be unaligned based on the different propagation delays associated with the first NTN cell and the second NTN cell.

Accordingly, the network entity 105-*b*, at 705, may transmit, to the UE 115-*a*, an indication indicative of ephemeris information associated with the neighboring cell (e.g., an NTN configuration of the non-serving cell). For example, the ephemeris information may include quantities related to the position, velocity, or both of the neighboring cell. In other words, ephemeris information may include any information indicative of a position (such as an astronomical position) and/or a velocity of the neighboring cell (such as of a satellite associated with the neighboring cell) over time. As such, ephemeris information may provide or indicate a trajectory of a satellite associated with the neighboring (NTN) cell in the sky. At 710, the UE 115-*a* may determine (e.g., calculate) the propagation delay for the serving cell, the non-serving cell (e.g., the neighboring cell), or both and report the respective propagation delays (e.g., at 715), a time difference of the non-serving cell relative to the serving cell, or both.

A gateway may coordinate discontinuous configuration information and reserved resources according to the time difference. For example, the gateway, via one or more feeder links, may coordinate (e.g., dynamically coordinate) the discontinuous configuration information and reserved resources to support flexible resource allocation for the first NTN cell and the second NTN cell. The gateway may dynamically activate or deactivate (e.g., via L1 signaling, such as group common L1 signaling using PDCCH, such as a specific downlink control information (DCI) format) discontinuous operations (e.g., per cell).

In some other examples, the UE 115-*a* may be within coverage of a TN cell and an NTN cell. In such examples, a first propagation delay associated with the NTN cell may be relatively large compared to a second propagation delay associated with the TN cell. As such, the UE 115-*a* may estimate and report (e.g., at 715) the first propagation delay, the second propagation delay, or both, or a relative time difference (e.g., a difference between the first propagation delay and the second propagation delay). Additionally, or alternatively, the TN cell (e.g., the network entity 105-*b*) may estimate an average propagation delay time (e.g., at 720) for one or more UEs (e.g., UEs within a coverage area of the TN cell) relative to one or more NTN cells (e.g., neighboring cells, overlapping cells, etc.). The TN cell may estimate the average propagation delay time at 720 based on ephemeris information from the NTN cell. For example, the NTN cell may transmit a signal indicative of ephemeris information (e.g., via X2 or AMF).

Additionally, or alternatively, the TN cell may refrain from estimating the average propagation delay time difference but indicate (such as inform, configure, or instruct) the UE 115-*a* to estimate the propagation delay time difference. For example, the UE 115-*a* may measure and report the time difference of the TN cell and the NTN cell. In such examples, the TN cell may be aware of a connection between the UE 115-*a* and the NTN cell. The UE 115-*a* may obtain ephemeris information associated with the NTN cell via an NTN configuration (e.g., an NTN-Config element of a non-serving cell) in a SIB of the NTN cell. Or, the UE 115-*a* may receive the ephemeris information of the NTN cell from the TN cell at 705 (e.g., the ephemeris information transmitted from the NTN cell to the TN cell via X2 or AMF).

In some aspects, the TN cell and the NTN cell may coordinate discontinuous operation configuration information and reserved resources (e.g., slots, resource blocks, etc.). For example, the TN cell and the NTN cell may coordinate the discontinuous operation configuration information (e.g., via X2 or AMF) to support flexible resource allocation between the TN cell and the NTN cell. In some examples, the TN cell, the NTN cell, or both may configure the UE 115-*a* to use non-shared frequency resources (e.g., as opposed to resources shared with a neighboring cell) based on activation and deactivation of discontinuous cell operation.

At 725, the UE 115-*a* may transmit a capability report to the network entity 105-*b*. For example, the capability report may include a capability of the UE 115-*a* to support the resource allocation. The resource allocation may be associated with the serving cell being a first NTN cell and the second cell (e.g., the neighboring cell) being a second NTN cell.

In some examples, the serving cell may be an NTN cell and the second cell may be a TN cell, or the serving cell may be a TN cell and the second cell may be an NTN cell. In such examples, the UE 115-*a* may transmit separate capability reports associated with the NTN cell and the TN cell. For example, the UE 115-*a* may transmit a first capability report for the NTN cell and a second capability report for the TN cell. Additionally, or alternatively, the UE 115-*a* may report a capability per-band, per-band combination (BC), per-feature set (FS), feature set per component carrier (FSPC), or any combination thereof (e.g., for either or both NTN-NTN coexistence and NTN-TN coexistence, separately or collectively).

At 730, the UE 115-*a* may receive one or more control messages from the network entity 105-*b*. For example, the UE 115-*a* may receive one or more control messages from the network entity 105-*b* including information indicative of a resource allocation associated with a discontinuous operation at a serving cell of the UE 115-*a*. The resource allocation may be associated with at least one NTN cell serving a coverage area including the UE 115-*a*. The one or more control messages may include or may be conveyed via unicast RRC signaling, one or more MAC-CEs, L1 signaling, or any combination thereof.

For example, the resource allocation may be based on a discontinuous operation at the serving cell of the UE and at a neighboring cell. In some aspects, the resource allocation may account for overlapping and non-overlapping active periods associated with the serving cell and the neighboring cell. In some examples, the serving cell and the neighboring cell may be an example of NTN-NTN coexistence, NTN-TN coexistence, or the like.

Additionally, or alternatively, the resource allocation may be based on the propagation delay determined by the UE 115-*a* at 710, estimated by the network entity 105-*b* at 715, or both. For example, the network entity 105-*b* may generate or construct respective resource allocations associated with respective discontinuous operation at respective cells in accordance with accounting for timing differences between the cells to one or more UEs 115 (e.g., to avoid a resource conflict between two resource allocations that might otherwise be caused by an overlap between DRX/DTX active durations due to propagation delay).

In some examples, the one or more control messages may include an indication that a first frequency band is configured as an SCell activated during a first portion of an active period and deactivated during a second portion of the active period and an inactive period. Additionally, or alternatively, the control messages may include an indication that the second frequency band is configured as a PCell activated during both the active period and the inactive period. In such examples, the network entity 105-*b*, the UE 115-*a*, or both may communicate via the PCell or the SCell during the first portion of the active period and via the PCell during the second portion of the active period and the inactive period.

Additionally, or alternatively, the one or more control messages may include an indication that the first frequency band is configured as a first BWP activated during a first portion of the active period and the inactive period. The one or more control messages may also include an indication that the second frequency band is configured as a second BWP (e.g., within the first BWP) activated during the second portion of the active period and the inactive period and deactivated during the first portion of the active period. In such cases, the network entity 105-*b*, the UE 115-*a*, or both may communicate via the first BWP during the first portion of the active period and via the second BWP during the second portion of the active period and the inactive period.

In some examples, the one or more control messages may include an indication that the first frequency band is configured as a first BWP activated during the active period and deactivated during the inactive period. The one or more control messages may also include an indication that the second frequency band is configured as a second BWP (e.g., within the first BWP) activated during the inactive period and deactivated during the active period. In such cases, the network entity 105-*b*, the UE 115-*a*, or both may communicate using the first BWP during the first portion of the active period, via a subset of the first BWP during a second portion of the active period, and via the second BWP during the inactive period.

In some examples, the network entity 105-*b* may transmit the resource allocation to an NTN cell via a gateway. The resource allocation may include an indication of reserved resources, a propagation delay associated with the NTN cell, or both.

In some examples, a configuration for the resource allocation (e.g., for NTN-NTN coexistence, NTN-TN coexistence, or both) may be applied to a BWP configuration (e.g., a downlink BWP configuration, an uplink BWP configuration, or both). In other words, a configuration of the flexible resource allocation for NTN/NTN and NTN/TN may be applied to downlink and uplink BWP configuration, respectively. For example, one of a first BWP or a second BWP may be configured as a special frequency resource such that the UE 115-*a*, the network entity 105-*b*, or both may not perform BWP switching.

At 735, the network entity 105-*b* and the UE 115-*a* may communicate one or more data messages. For example, the network entity 105-*b* and the UE 115-*a* may communicate the one or more data messages during an active period associated with the discontinuous operation at the serving cell using first frequency resources of a first frequency band according to the resource allocation. The active period of the serving cell may be non-overlapping with a second active period associated with a second discontinuous operation at a second cell.

For example, the network entity 105-*b* and the UE 115-*a* may communicate using shared frequency resources (e.g., shared between the serving cell and the second cell) based on the active period being non-overlapping with an active period (e.g., any active period) of the second cell.

In some examples, the network entity 105-*b*, the UE 115-*a*, or both may refrain from communicating via a subset of frequency resources of the first frequency band according to the resource allocation. For example, the subset of frequency resources may be reserved for one or more second signals communicated between a second UE and the second cell (e.g., the neighboring cell). That is, the subset of frequency resources may be reserved for an SSB, a SIB, a RACH message, one or more reference signals, or the like. Additionally, or alternatively, the second UE and the second cell may communicate the one or more second signals during a non-active period of the second cell.

Additionally, or alternatively, the network entity 105-*b*, the UE 115-*a*, or both may communicate during an extension of the active period using the second frequency band (e.g., according to a restriction of communication to the second frequency band).

At 740, the network entity 105-*b* and the UE 115-*a* may communicate one or more signals. For example, the network entity 105-*b* and the UE 115-*a* may communicate the one or more signals during an inactive period associated with the discontinuous operation at the serving cell using second frequency resources of a second frequency band according to the resource allocation.

In some examples, the one or more signals may be restricted to the second frequency band based on the resource allocation. For example, the second frequency resources may be reserved resources for the network entity 105-*b*, the UE 115-*a*, or both to communicate an SSB, a SIB, a RACH message, one or more reference signals, or a combination thereof. In some examples, the second frequency resources may overlap with an active period of the second cell (e.g., the neighboring cell). That is, the second frequency resources may be reserved for the serving cell during the active period of the second cell. In such examples, the second frequency band may be smaller than the first frequency band. That is, at least a portion of the first frequency band may be non-overlapping with the second frequency band.

In some examples, a transmission or reception time associated with the one or more data messages, the one or more signals, or both may be configured separately for uplink and downlink transmissions. For example, the uplink and downlink transmissions may be separately configured based on a first active time associated with DRX and a second active time associated with DTX, where the first active time is different than the second active time.

At 745, the UE 115-*a* may receive one or more messages from the network entity 105-*b* activating or deactivating the discontinuous operation. For example, the network entity 105-*b* may dynamically activate or deactivate the discontinuous operation (e.g., via L1 signaling). In some implementations, cell DRX/DTX may be dynamically activated/deactivated by L1 signaling per cell and may include dynamic coordination to configure flexible resource allocation to the UE 115-*a*. Additionally, or alternatively, for dynamic cell DRX/DTX activation/deactivation, the UE 115-*a* may be configured to (e.g., only) use non-shared frequency resources by a serving cell (not overlapping with that of a neighbor cell).

Figure 8:
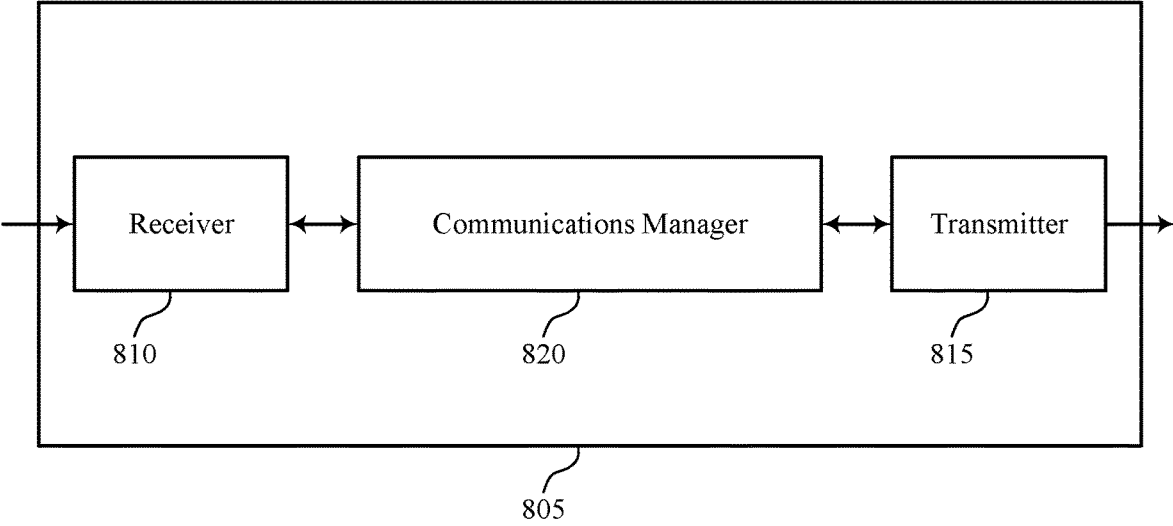
FIGS. 8 and 9 show block diagrams of devices that support NTN discontinuous operation coexistence in accordance with one or more aspects of the present disclosure.

FIG. 8 shows a block diagram 800 of a device 805 that supports NTN discontinuous operation coexistence in accordance with one or more aspects of the present disclosure. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to NTN discontinuous operation coexistence). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to NTN discontinuous operation coexistence). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of NTN discontinuous operation coexistence as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. For example, the communications manager 820 is capable of, configured to, or operable to support a means for receiving one or more control messages including information indicative of a resource allocation associated with a discontinuous operation at a serving cell of the UE, where the resource allocation is further in association with at least one NTN cell serving a coverage area including the UE. The communications manager 820 is capable of, configured to, or operable to support a means for communicating, during an active period associating with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell. The communications manager 820 is capable of, configured to, or operable to support a means for communicating, during an inactive period associating with the discontinuous operation at the serving cell, one or more signals via second frequency resources of a second frequency band in accordance with the resource allocation associated with the discontinuous operation.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for more efficient utilization of communication resources and increased system throughput.

Figure 9:
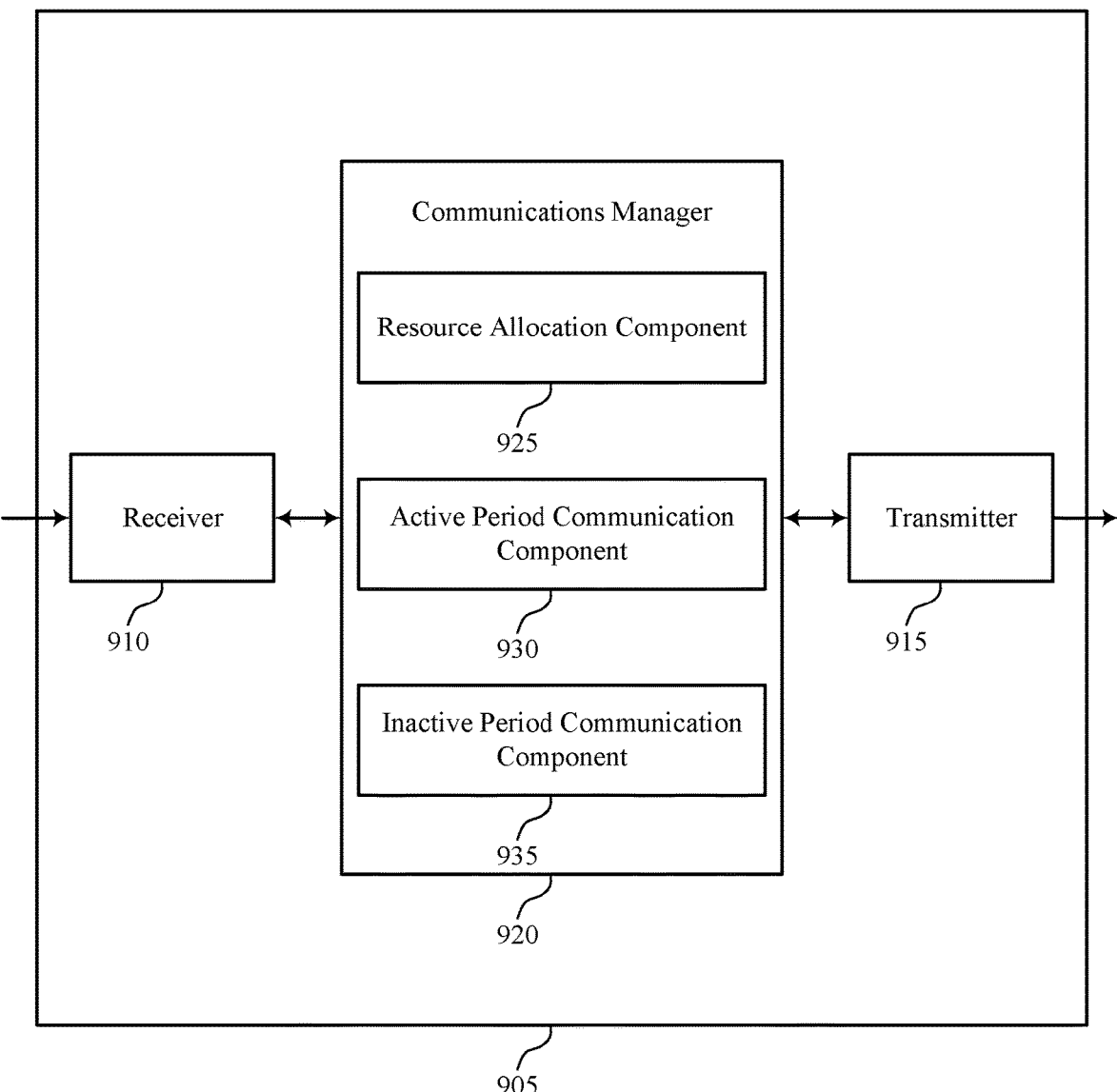

FIG. 9 shows a block diagram 900 of a device 905 that supports NTN discontinuous operation coexistence in accordance with one or more aspects of the present disclosure. The device 905 may be an example of aspects of a device 805 or a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to NTN discontinuous operation coexistence). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to NTN discontinuous operation coexistence). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of NTN discontinuous operation coexistence as described herein. For example, the communications manager 920 may include a resource allocation component 925, an active period communication component 930, an inactive period communication component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. The resource allocation component 925 is capable of, configured to, or operable to support a means for receiving one or more control messages including information indicative of a resource allocation associated with a discontinuous operation at a serving cell of the UE, where the resource allocation is further in association with at least one NTN cell serving a coverage area including the UE. The active period communication component 930 is capable of, configured to, or operable to support a means for communicating, during an active period associated with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell. The inactive period communication component 935 is capable of, configured to, or operable to support a means for communicating, during an inactive period associated with the discontinuous operation at the serving cell, one or more signals via second frequency resources of a second frequency band in accordance with the resource allocation associated with the discontinuous operation.

Figure 10:
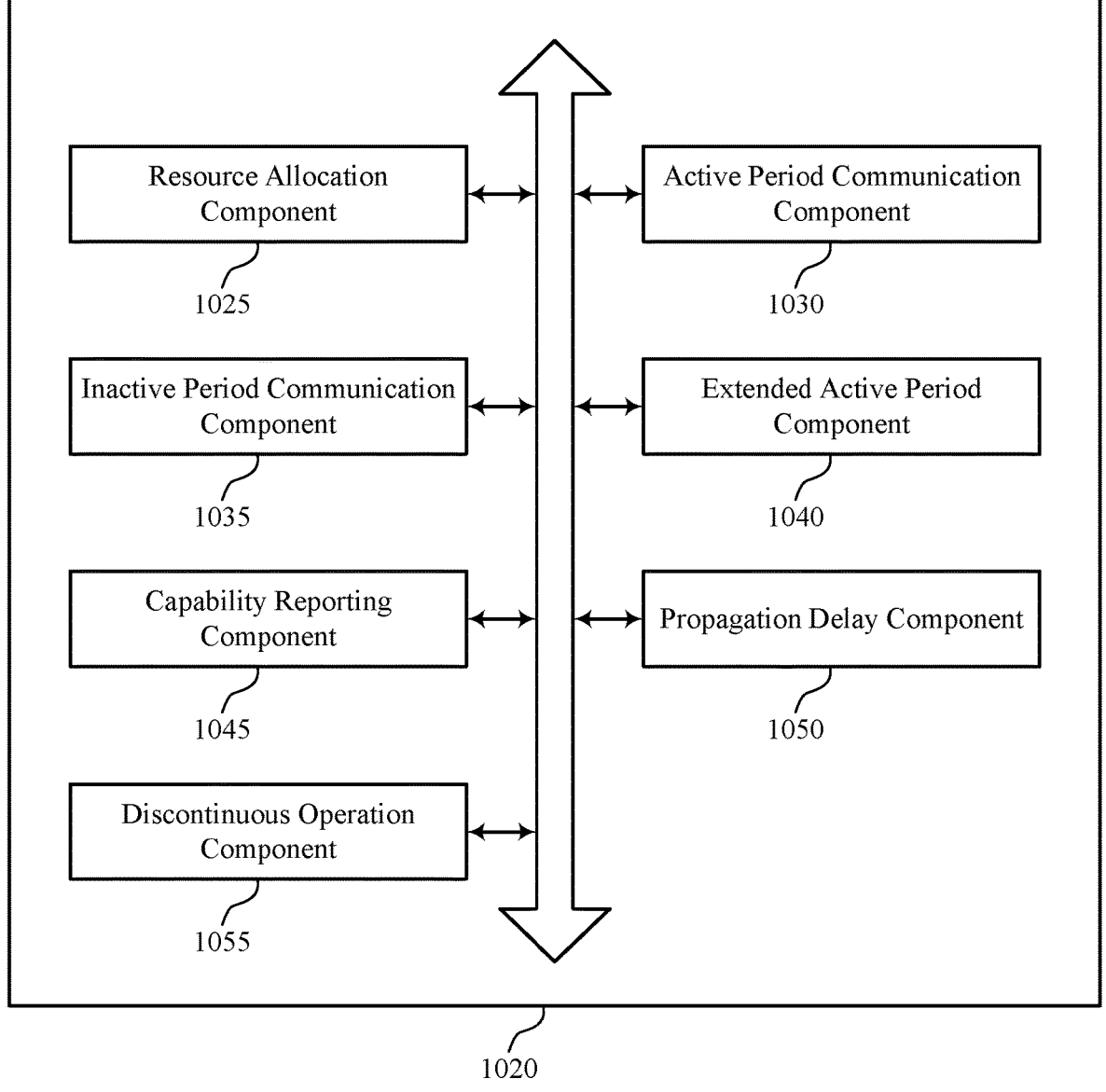
FIG. 10 shows a block diagram of a communications manager that supports NTN discontinuous operation coexistence in accordance with one or more aspects of the present disclosure.

FIG. 10 shows a block diagram 1000 of a communications manager 1020 that supports NTN discontinuous operation coexistence in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of non-terrestrial network (NTN) discontinuous operation coexistence as described herein. For example, the communications manager 1020 may include a resource allocation component 1025, an active period communication component 1030, an inactive period communication component 1035, an extended active period component 1040, a capability reporting component 1045, a propagation delay component 1050, a discontinuous operation component 1055, or any combination thereof. Each of these components, or components or subcomponents thereof (e.g., one or more processors, one or more memories), may communicate, directly or indirectly, with one another (e.g., via one or more buses).

The communications manager 1020 may support wireless communication in accordance with examples as disclosed herein. The resource allocation component 1025 is capable of, configured to, or operable to support a means for receiving one or more control messages including information indicative of a resource allocation associated with a discontinuous operation at a serving cell of the UE, where the resource allocation is further in association with at least one non-terrestrial network (NTN) cell serving a coverage area including the UE. The active period communication component 1030 is capable of, configured to, or operable to support a means for communicating, during an active period associated with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell. The inactive period communication component 1035 is capable of, configured to, or operable to support a means for communicating, during an inactive period associated with the discontinuous operation at the serving cell, one or more signals via second frequency resources of a second frequency band in accordance with the resource allocation associated with the discontinuous operation.

In some examples, the inactive period communication component 1035 is capable of, configured to, or operable to support a means for communicating a synchronization signal block (SSB), an SIB, a RACH message, one or more reference signals, or a combination thereof via one or more reserved resources during the inactive period, where the one or more signals include the SSB, the SIB, the RACH message, the one or more reference signals, or the combination thereof, and where the one or more reserved resources include the second frequency resources of the second frequency band.

In some examples, the active period communication component 1030 is capable of, configured to, or operable to support a means for refraining from communicating, during the active period, via a subset of frequency resources of the first frequency band in accordance with the resource allocation associated with the discontinuous operation, where the subset of frequency resources are reserved for one or more second signals communicated between a second UE and the second cell.

In some examples, the one or more second signals include a synchronization signal block (SSB), an SIB, a RACH message, one or more reference signals, or a combination thereof.

In some examples, the resource allocation component 1025 is capable of, configured to, or operable to support a means for receiving, via the one or more control messages, an indication that the first frequency band is configured as a secondary cell activated during a first portion of the active period and deactivated during a second portion of the active period and the inactive period. In some examples, the resource allocation component 1025 is capable of, configured to, or operable to support a means for receiving, via the one or more control messages, an indication that the second frequency band is configured as a primary cell activated during both the active period and the inactive period.

In some examples, the active period communication component 1030 is capable of, configured to, or operable to support a means for communicating, during the first portion of the active period, via the primary cell or the secondary cell in accordance with the resource allocation associated with the discontinuous operation. In some examples, the active period communication component 1030 is capable of, configured to, or operable to support a means for communicating, during the second portion of the active period and the inactive period, via the primary cell in accordance with the resource allocation associated with the discontinuous operation.

In some examples, communication of the one or more signals is restricted from the secondary cell in accordance with the resource allocation associated with the discontinuous operation.

In some examples, the resource allocation component 1025 is capable of, configured to, or operable to support a means for receiving, via the one or more control messages, an indication that the first frequency band is configured as a first bandwidth part activated during a first portion of the active period and deactivated during a second portion of the active period and the inactive period. In some examples, the resource allocation component 1025 is capable of, configured to, or operable to support a means for receiving, via the one or more control messages, an indication that the second frequency band is configured as a second bandwidth part activated during the second portion of the active period and the inactive period and deactivated during the first portion of the active period.

In some examples, the active period communication component 1030 is capable of, configured to, or operable to support a means for communicating, during the first portion of the active period, via the first bandwidth part in accordance with the resource allocation associated with the discontinuous operation. In some examples, the active period communication component 1030 is capable of, configured to, or operable to support a means for communicating, during the second portion of the active period and the inactive period, via the second bandwidth part in accordance with the resource allocation associated with the discontinuous operation.

In some examples, the second bandwidth part is smaller than the first bandwidth part. In some examples, the first bandwidth part overlaps at least partially with the second bandwidth part. In some examples, communication of the one or more signals is restricted to the second bandwidth part when the first bandwidth is activated and when the first bandwidth part is deactivated in accordance with the resource allocation associated with the discontinuous operation.

In some examples, the resource allocation component 1025 is capable of, configured to, or operable to support a means for receiving, via the one or more control messages, an indication that the first frequency band is configured as a first bandwidth part activated during the active period and deactivated during the inactive period. In some examples, the resource allocation component 1025 is capable of, configured to, or operable to support a means for receiving, via the one or more control messages, an indication that the second frequency band is configured as a second bandwidth part activated during the inactive period and deactivated during the active period.

In some examples, the active period communication component 1030 is capable of, configured to, or operable to support a means for communicating, during a first portion of the active period, via the first bandwidth part in accordance with the resource allocation associated with the discontinuous operation. In some examples, the active period communication component 1030 is capable of, configured to, or operable to support a means for communicating, during a second portion of the active period, via a subset of the first bandwidth part in accordance with the resource allocation associated with the discontinuous operation. In some examples, the inactive period communication component 1035 is capable of, configured to, or operable to support a means for communicating, during the inactive period, via the second bandwidth part in accordance with the resource allocation associated with the discontinuous operation.

In some examples, the second bandwidth part is smaller than the first bandwidth part. In some examples, the first bandwidth part overlaps at least partially with the second bandwidth part. In some examples, the subset of the first bandwidth part is reserved for one or more second signals communicated between a second UE and the second cell. In some examples, communication of the one or more signals is restricted to the second bandwidth part when the first bandwidth is activated and when the first bandwidth part is deactivated in accordance with the resource allocation associated with the discontinuous operation.

In some examples, the extended active period component 1040 is capable of, configured to, or operable to support a means for communicating, during an extension of the active period, via the second frequency band in accordance with the resource allocation associated with the discontinuous operation.

In some examples, during the extension of the active period, communication to or from the UE is restricted to the second frequency band in accordance with the resource allocation associated with the discontinuous operation.

In some examples, the capability reporting component 1045 is capable of, configured to, or operable to support a means for transmitting a report indicating a capability of the UE to support the resource allocation associated with the discontinuous operation, where the resource allocation is in association with the serving cell of the UE being a first NTN cell and the second cell being a second NTN cell.

In some examples, the capability reporting component 1045 is capable of, configured to, or operable to support a means for transmitting a first report indicating a first capability of the UE to support the resource allocation associated with the discontinuous operation, where the resource allocation is in association with the serving cell of the UE being an NTN cell. In some examples, the capability reporting component 1045 is capable of, configured to, or operable to support a means for transmitting a second report indicating a second capability of the UE to support the resource allocation associated with the discontinuous operation, where the resource allocation is in association with the serving cell of the UE being a terrestrial network cell.

In some examples, the propagation delay component 1050 is capable of, configured to, or operable to support a means for receiving an indication of ephemeris information associated with one or more cells adjacent to the serving cell, where the serving cell is an NTN cell and the one or more cells adjacent to the serving cell are one or more other NTN cells. In some examples, the propagation delay component 1050 is capable of, configured to, or operable to support a means for determining a propagation delay for the NTN cell relative to the one or more other NTN cells based on the indication of the ephemeris information, where the resource allocation is based on the propagation delay.

In some examples, the discontinuous operation component 1055 is capable of, configured to, or operable to support a means for receiving an activation or deactivation message associated with the discontinuous operation.

In some examples, the resource allocation is in association with the at least one NTN cell and at least one terrestrial network cell each serving the coverage area including the UE.

In some examples, the propagation delay component 1050 is capable of, configured to, or operable to support a means for receiving one or more first signals via the at least one NTN cell. In some examples, the propagation delay component 1050 is capable of, configured to, or operable to support a means for receiving one or more second signals via the at least one terrestrial network cell. In some examples, the propagation delay component 1050 is capable of, configured to, or operable to support a means for determining a first propagation delay associated with the at least one NTN cell and a second propagation delay associated with the at least one terrestrial network cell. In some examples, the propagation delay component 1050 is capable of, configured to, or operable to support a means for transmitting a report of the first propagation delay, the second propagation delay, or both.

In some examples, the propagation delay component 1050 is capable of, configured to, or operable to support a means for receiving ephemeris information associated with the at least one NTN cell via an NTN configuration information element associated with the at least one NTN cell.

In some examples, the one or more signals are restricted to the second frequency band in accordance with the resource allocation associated with the discontinuous operation. In some examples, the second frequency band is smaller than the first frequency band.

In some examples, the resource allocation allocates the first frequency band to the UE during active periods associated with the discontinuous operation and allocates the second frequency band to the UE during inactive periods associated with the discontinuous operation.

In some examples, at least a portion of the first frequency band is non-overlapping with the second frequency band.

In some examples, the at least one NTN cell includes the serving cell of the UE, the second cell, or both. In some examples, the second cell is a neighbor cell to the serving cell of the UE.

Figure 11:
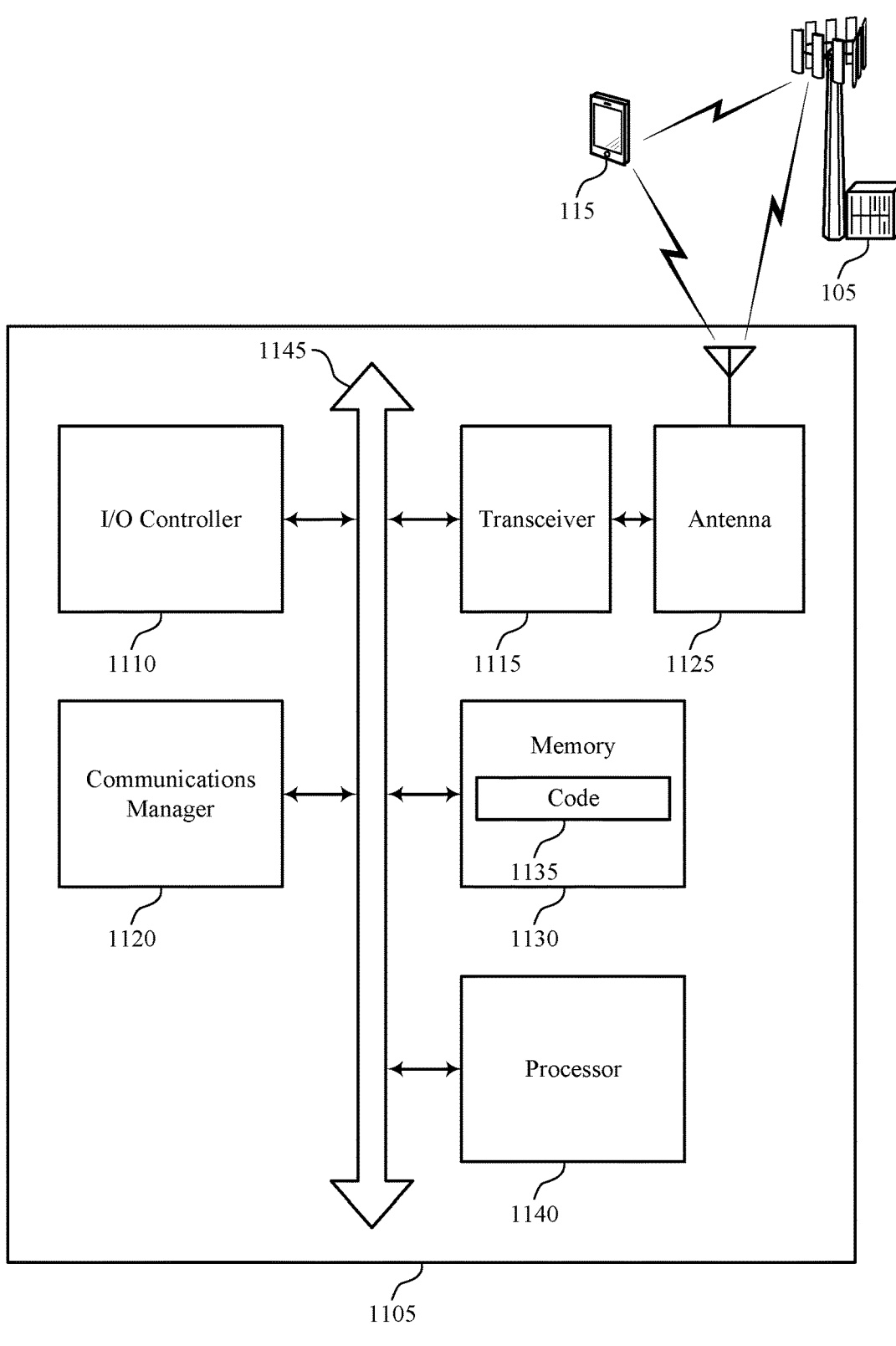
FIG. 11 shows a diagram of a system including a device that supports NTN discontinuous operation coexistence in accordance with one or more aspects of the present disclosure.

FIG. 11 shows a diagram of a system 1100 including a device 1105 that supports NTN discontinuous operation coexistence in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter

815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, processor-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting NTN discontinuous operation coexistence). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. As such, the at least one processor 1140 or a processing system including the at least one processor 1140 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1130 or otherwise, to perform one or more of the functions described herein.

The communications manager 1120 may support wireless communication in accordance with examples as disclosed herein. For example, the communications manager 1120 is capable of, configured to, or operable to support a means for receiving one or more control messages including information indicative of a resource allocation associated with a discontinuous operation at a serving cell of the UE, where the resource allocation is further in association with at least one NTN cell serving a coverage area including the UE. The communications manager 1120 is capable of, configured to, or operable to support a means for communicating, during an active period associating with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell. The communications manager 1120 is capable of, configured to, or operable to support a means for communicating, during an inactive period associating with the discontinuous operation at the serving cell, one or more signals via second frequency resources of a second frequency band in accordance with the resource allocation associated with the discontinuous operation.

By including or configuring the communications manager 1120 in accordance with examples as described herein, the device 1105 may support techniques for more efficient utilization of communication resources, improved coordination between devices, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of NTN discontinuous operation coexistence as described herein, or the at least one processor 1140 and the at least one memory 1130 may be otherwise configured to, individually or collectively, perform or support such operations.

Figure 12:
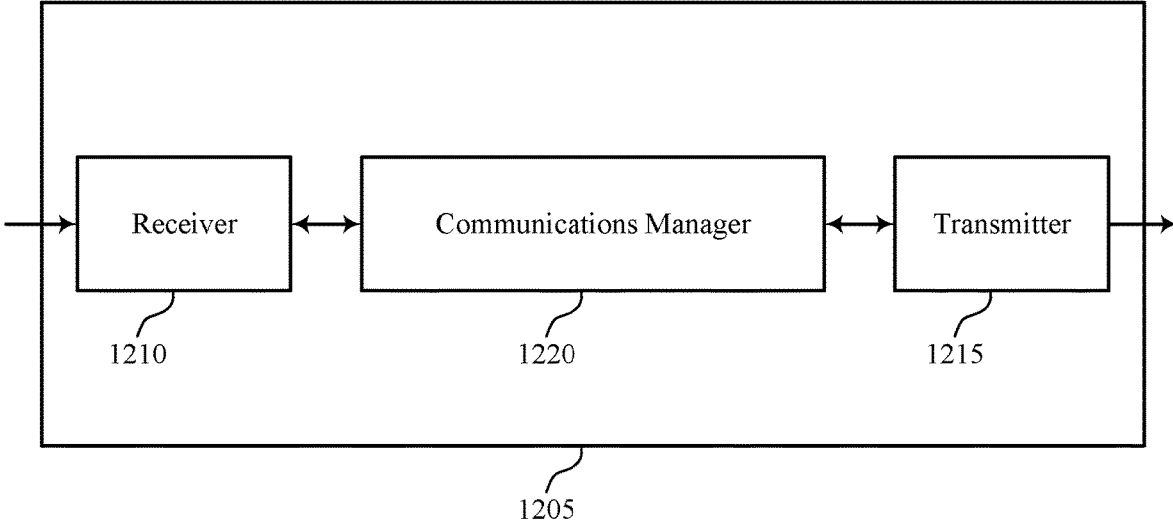
FIGS. 12 and 13 show block diagrams of devices that support NTN discontinuous operation coexistence in accordance with one or more aspects of the present disclosure.

FIG. 12 shows a block diagram 1200 of a device 1205 that supports NTN discontinuous operation coexistence in accordance with one or more aspects of the present disclosure. The device 1205 may be an example of aspects of a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to, individually or collectively, support or enable the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of NTN discontinuous operation coexistence as described herein. For example, the communications manager 1220, the receiver 1210, the transmitter 1215, or various combinations or components thereof may be capable of performing one or more of the functions described herein.

In some examples, the communications manager 1220, the receiver 1210, the transmitter 1215, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1220, the receiver 1210, the transmitter 1215, or various combinations or components thereof may be implemented in code (e.g., as communications management software or firmware) executed by at least one processor. If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication in accordance with examples as disclosed herein. For example, the communications manager 1220 is capable of, configured to, or operable to support a means for transmitting one or more control messages including information indicative of a resource allocation associated with a discontinuous operation at a serving cell of a UE, where the resource allocation is in association with at least one NTN cell serving a coverage area including the UE. The communications manager 1220 is capable of, configured to, or operable to support a means for communicating, during an active period associating with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell. The communications manager 1220 is capable of, configured to, or operable to support a means for communicating, during an inactive period associating with the discontinuous operation at the serving cell, one or more signals via second frequency resources of a second frequency band in accordance with the resource allocation associated with the discontinuous operation.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for more efficient utilization of communication resources and improved system throughput.

Figure 13:
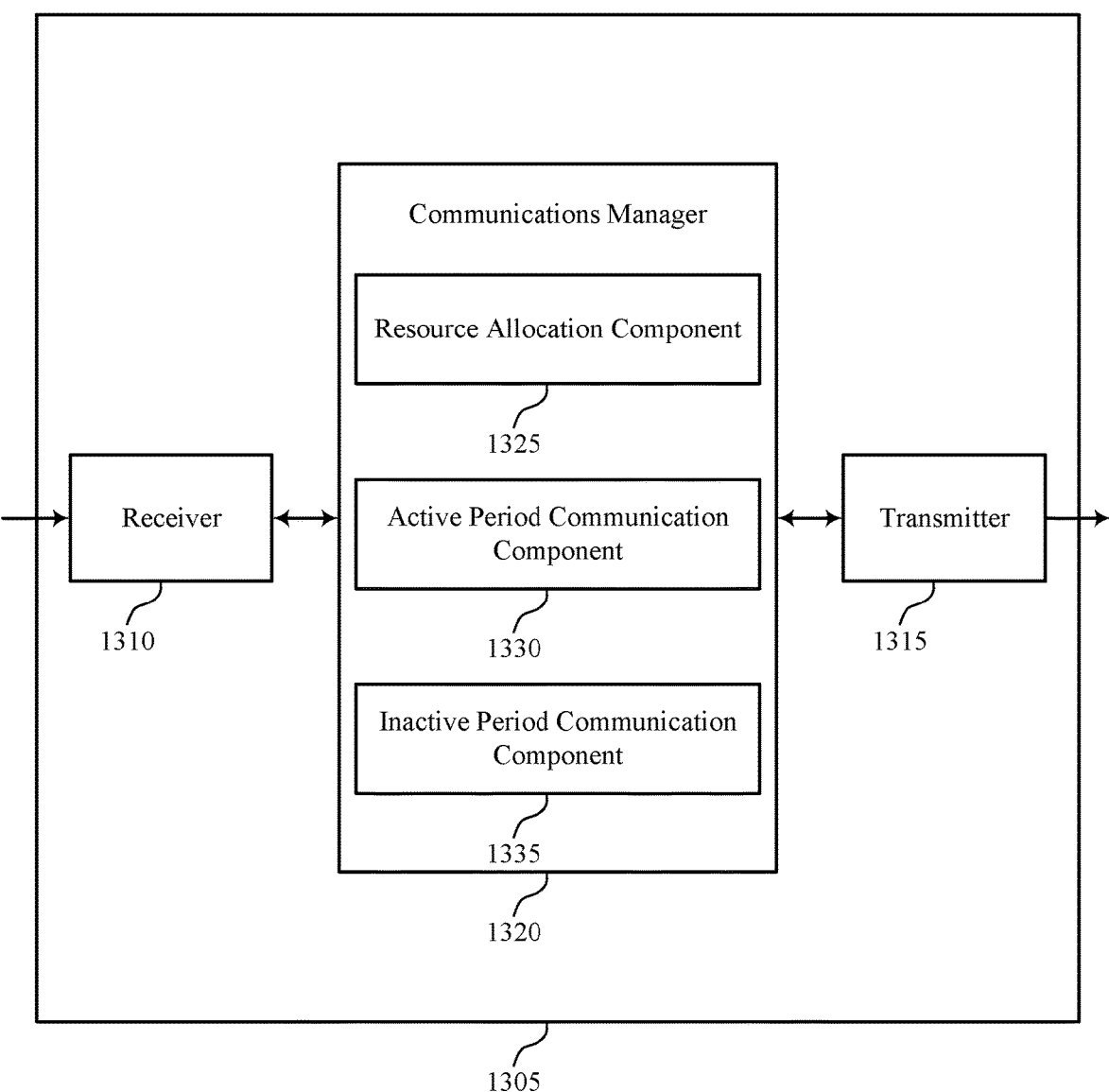

FIG. 13 shows a block diagram 1300 of a device 1305 that supports NTN discontinuous operation coexistence in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled with at least one memory, to support the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of NTN discontinuous operation coexistence as described herein. For example, the communications manager 1320 may include a resource allocation component 1325, an active period communication component 1330, an inactive period communication component 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication in accordance with examples as disclosed herein. The resource allocation component 1325 is capable of, configured to, or operable to support a means for transmitting one or more control messages including information indicative of a resource allocation associated with a discontinuous operation at a serving cell of a UE, where the resource allocation is in association with at least one NTN cell serving a coverage area including the UE. The active period communication component 1330 is capable of, configured to, or operable to support a means for communicating, during an active period associated with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell. The inactive period communication component 1335 is capable of, configured to, or operable to support a means for communicating, during an inactive period associated with the discontinuous operation at the serving cell, one or more signals via second frequency resources of a second frequency band in accordance with the resource allocation associated with the discontinuous operation.

Figure 14:
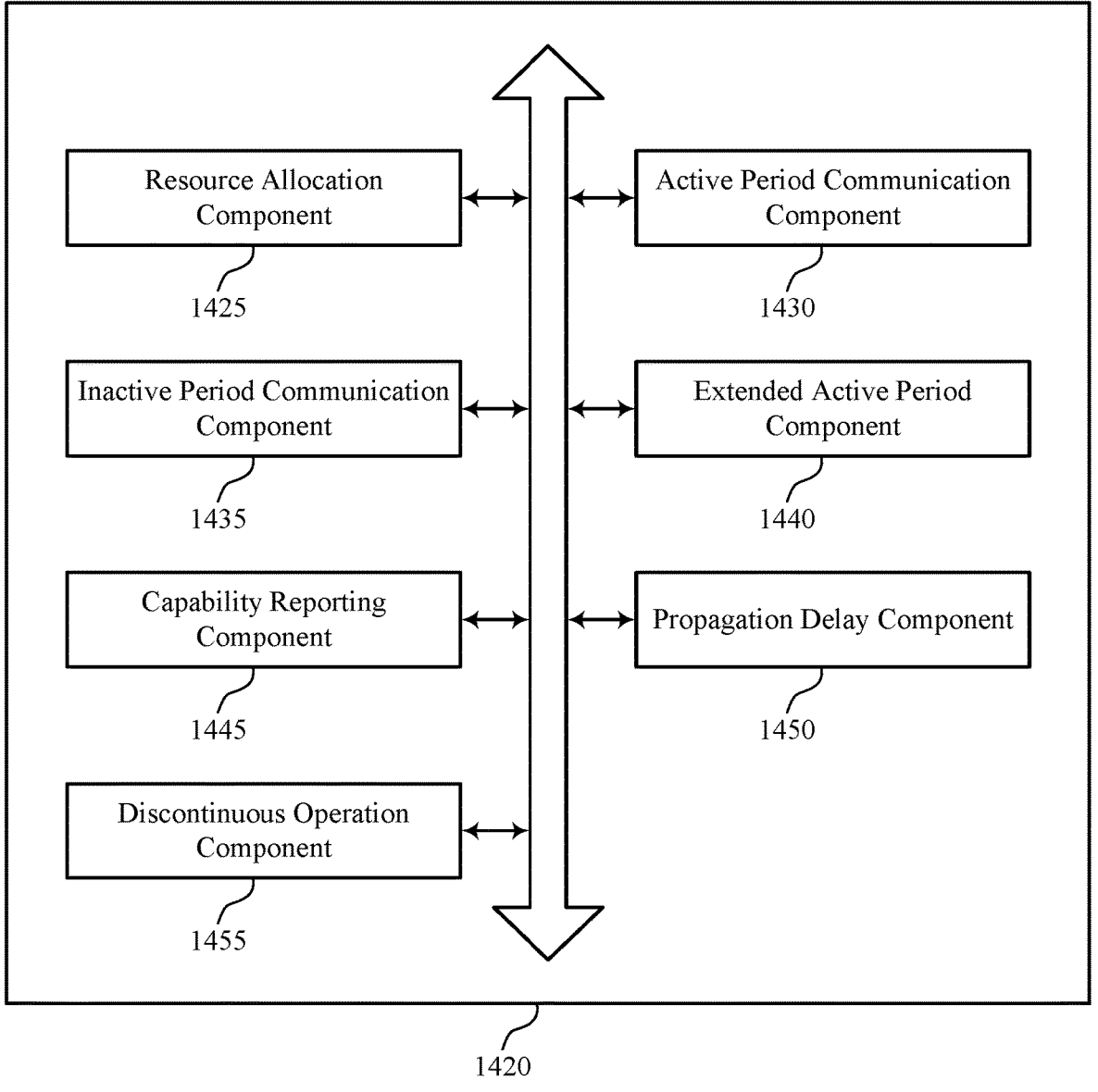
FIG. 14 shows a block diagram of a communications manager that supports NTN discontinuous operation coexistence in accordance with one or more aspects of the present disclosure.

FIG. 14 shows a block diagram 1400 of a communications manager 1420 that supports NTN discontinuous operation coexistence in accordance with one or more aspects of the present disclosure. The communications manager 1420 may be an example of aspects of a communications manager

1220, a communications manager 1320, or both, as described herein. The communications manager 1420, or various components thereof, may be an example of means for performing various aspects of non-terrestrial network (NTN) discontinuous operation coexistence as described herein. For example, the communications manager 1420 may include a resource allocation component 1425, an active period communication component 1430, an inactive period communication component 1435, an extended active period component 1440, a capability reporting component 1445, a propagation delay component 1450, a discontinuous operation component 1455, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication in accordance with examples as disclosed herein. The resource allocation component 1425 is capable of, configured to, or operable to support a means for transmitting one or more control messages including information indicative of a resource allocation associated with a discontinuous operation at a serving cell of a UE, where the resource allocation is in association with at least one non-terrestrial network (NTN) cell serving a coverage area including the UE. The active period communication component 1430 is capable of, configured to, or operable to support a means for communicating, during an active period associated with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell. The inactive period communication component 1435 is capable of, configured to, or operable to support a means for communicating, during an inactive period associated with the discontinuous operation at the serving cell, one or more signals via second frequency resources of a second frequency band in accordance with the resource allocation associated with the discontinuous operation.

In some examples, the resource allocation component 1425 is capable of, configured to, or operable to support a means for communicating with the UE in accordance with the resource allocation associated with the discontinuous operation. In some examples, the inactive period communication component 1435 is capable of, configured to, or operable to support a means for communicating, during at least a portion of the inactive period, with a second UE via the first frequency band and a subset of the second frequency band, where a remainder of the second frequency band outside of the subset of the second frequency band includes the second frequency resources via which the network entity and the UE communicate the one or more signals.

In some examples, at least the portion of the inactive period during which the network entity communicates with the second UE includes a second active period associated with a second discontinuous operation at a second serving cell of the second UE.

In some examples, the resource allocation component 1425 is capable of, configured to, or operable to support a means for transmitting, to the at least one NTN cell and one or more additional cells, the information indicative of the resource allocation associated with the discontinuous operation at the serving cell of the UE via a gateway, where the information includes an indication of reserved resources, a propagation delay associated with the at least one NTN cell and the one or more additional cells, or both.

In some examples, the inactive period communication component 1435 is capable of, configured to, or operable to support a means for communicating a synchronization signal block (SSB), an SIB, a RACH message, one or more reference signals, or a combination thereof via one or more reserved resources during the inactive period, where the one or more signals include the SSB, the SIB, the RACH message, the one or more reference signals, or the combination thereof, and where the one or more reserved resources include the second frequency resources of the second frequency band.

In some examples, the resource allocation component 1425 is capable of, configured to, or operable to support a means for transmitting, via the one or more control messages, an indication that the first frequency band is configured as a secondary cell activated during a first portion of the active period and deactivated during a second portion of the active period and the inactive period. In some examples, the resource allocation component 1425 is capable of, configured to, or operable to support a means for transmitting, via the one or more control messages, an indication that the second frequency band is configured as a primary cell activated during both the active period and the inactive period.

In some examples, the resource allocation component 1425 is capable of, configured to, or operable to support a means for transmitting, via the one or more control messages, an indication that the first frequency band is configured as a secondary cell activated during a first portion of the active period and deactivated during a second portion of the active period and the inactive period. In some examples, the resource allocation component 1425 is capable of, configured to, or operable to support a means for transmitting, via the one or more control messages, an indication that the second frequency band is configured as a primary cell activated during both the active period and the inactive period.

In some examples, communication of the one or more signals is restricted from the secondary cell in accordance with the resource allocation associated with the discontinuous operation.

In some examples, the resource allocation component 1425 is capable of, configured to, or operable to support a means for transmitting, via the one or more control messages, an indication that the first frequency band is configured as a first bandwidth part activated during a first portion of the active period and deactivated during a second portion of the active period and the inactive period. In some examples, the resource allocation component 1425 is capable of, configured to, or operable to support a means for transmitting, via the one or more control messages, an indication that the second frequency band is configured as a second bandwidth part activated during a second portion of the active period and the inactive period and deactivated during the first portion of the active period.

In some examples, the active period communication component 1430 is capable of, configured to, or operable to support a means for communicating, during the first portion of the active period, via the first bandwidth part in accordance with the resource allocation associated with the discontinuous operation. In some examples, the active period communication component 1430 is capable of, configured to, or operable to support a means for communicating, during the second portion of the active period and the inactive period, via the second bandwidth part in accordance with the resource allocation associated with the discontinuous operation.

In some examples, the second bandwidth part is smaller than the first bandwidth part. In some examples, the first bandwidth part overlaps at least partially with the second bandwidth part. In some examples, communication of the one or more signals is restricted to the second bandwidth part when the first bandwidth is activated and when the first bandwidth part is deactivated in accordance with the resource allocation associated with the discontinuous operation.

In some examples, the resource allocation component 1425 is capable of, configured to, or operable to support a means for transmitting, via the one or more control messages, an indication that the first frequency band is configured as a first bandwidth part activated during the active period and deactivated during the inactive period. In some examples, the resource allocation component 1425 is capable of, configured to, or operable to support a means for transmitting, via the one or more control messages, an indication that the second frequency band is configured as a second bandwidth part activated during the inactive period and deactivated during the active period.

In some examples, the active period communication component 1430 is capable of, configured to, or operable to support a means for communicating, during a first portion of the active period, via the first bandwidth part in accordance with the resource allocation associated with the discontinuous operation. In some examples, the active period communication component 1430 is capable of, configured to, or operable to support a means for communicating, during a second portion of the active period, via a subset of the first bandwidth part in accordance with the resource allocation associated with the discontinuous operation. In some examples, the inactive period communication component 1435 is capable of, configured to, or operable to support a means for communicating, during the inactive period, via the second bandwidth part in accordance with the resource allocation associated with the discontinuous operation.

In some examples, the second bandwidth part is smaller than the first bandwidth part. In some examples, the first bandwidth part overlaps at least partially with the second bandwidth part. In some examples, the subset of the first bandwidth part is reserved for one or more second signals communicated between a second UE and the second cell. In some examples, communication of the one or more signals is restricted to the second bandwidth part when the first bandwidth is activated and when the first bandwidth part is deactivated in accordance with the resource allocation associated with the discontinuous operation.

In some examples, the extended active period component 1440 is capable of, configured to, or operable to support a means for communicating, during an extension of the active period, via the second frequency band in accordance with the resource allocation associated with the discontinuous operation.

In some examples, during the extension of the active period, communication to or from the UE is restricted to the second frequency band in accordance with the resource allocation associated with the discontinuous operation.

In some examples, the capability reporting component 1445 is capable of, configured to, or operable to support a means for receiving a report indicating a capability of the UE to support the resource allocation associated with the discontinuous operation, where the resource allocation is in association with the serving cell of the UE being a first NTN cell and the second cell being a second NTN cell.

In some examples, the capability reporting component 1445 is capable of, configured to, or operable to support a means for receiving a first report indicating a first capability of the UE to support the resource allocation associated with the discontinuous operation, where the resource allocation is in association with the serving cell of the UE being an NTN cell. In some examples, the capability reporting component 1445 is capable of, configured to, or operable to support a means for receiving a second report indicating a second capability of the UE to support the resource allocation associated with the discontinuous operation, where the resource allocation is in association with the serving cell of the UE being a terrestrial network cell.

In some examples, the propagation delay component 1450 is capable of, configured to, or operable to support a means for transmitting an indication of ephemeris information associated with one or more cells adjacent to the serving cell, where the serving cell is an NTN cell and the one or more cells adjacent to the serving cell are one or more other NTN cells.

In some examples, the discontinuous operation component 1455 is capable of, configured to, or operable to support a means for transmitting an activation or deactivation message associated with the discontinuous operation.

In some examples, the resource allocation is in association with the at least one NTN cell and at least one terrestrial network cell each serving the coverage area including the UE.

In some examples, the propagation delay component 1450 is capable of, configured to, or operable to support a means for transmitting one or more first signals via the at least one NTN cell. In some examples, the propagation delay component 1450 is capable of, configured to, or operable to support a means for transmitting one or more second signals via the at least one terrestrial network cell. In some examples, the propagation delay component 1450 is capable of, configured to, or operable to support a means for receiving a report of a first propagation delay, a second propagation delay, or both.

In some examples, the network entity is associated with the at least one terrestrial network cell, and the propagation delay component 1450 is capable of, configured to, or operable to support a means for receiving an indication of ephemeris information from the at least one NTN cell. In some examples, the network entity is associated with the at least one terrestrial network cell, and the propagation delay component 1450 is capable of, configured to, or operable to support a means for estimating, at the at least one terrestrial network cell, an average propagation delay between the UE and the at least one NTN cell.

In some examples, the propagation delay component 1450 is capable of, configured to, or operable to support a means for transmitting ephemeris information associated with the at least one NTN cell via an NTN configuration information element associated with the at least one NTN cell.

In some examples, the one or more signals are restricted to the second frequency band in accordance with the resource allocation associated with the discontinuous operation. In some examples, the second frequency band is smaller than the first frequency band.

In some examples, the resource allocation allocates the first frequency band to the UE during active periods associated with the discontinuous operation and allocates the second frequency band to the UE during inactive periods associated with the discontinuous operation.

In some examples, at least a portion of the first frequency band is non-overlapping with the second frequency band.

In some examples, the at least one NTN cell includes the serving cell of the UE, the second cell, or both. In some examples, the second cell is a neighbor cell to the serving cell of the UE.

Figure 15:
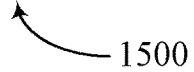
FIG. 15 shows a diagram of a system including a device that supports NTN discontinuous operation coexistence in accordance with one or more aspects of the present disclosure.

FIG. 15 shows a diagram of a system 1500 including a device 1505 that supports NTN discontinuous operation coexistence in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, at least one memory 1525, code 1530, and at least one processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or one or more memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or one or more memory components (e.g., the at least one processor 1535, the at least one memory 1525, or both), may be included in a chip or chip assembly that is installed in the device 1505. In some examples, the transceiver 1510 may be operable to support communications via one or more communications links (e.g., a communication link 125, a backhaul communication link 120, a midhaul communication link 162, a fronthaul communication link 168).

The at least one memory 1525 may include RAM, ROM, or any combination thereof. The at least one memory 1525 may store computer-readable, processor-readable, computer-executable code 1530 including instructions that, when executed by one or more of the at least one processor 1535, cause the device 1505 to perform various functions described herein. The code 1530 may be stored in a non-transitory computer-readable medium such as system memory or another type of memory. In some cases, the code 1530 may not be directly executable by a processor of the at least one processor 1535 but may cause a computer (e.g., when compiled and executed) to perform functions described herein. In some cases, the at least one memory 1525 may contain, among other things, a BIOS which may control basic hardware or software operation such as the interaction with peripheral components or devices. In some examples, the at least one processor 1535 may include multiple processors and the at least one memory 1525 may include multiple memories. One or more of the multiple processors may be coupled with one or more of the multiple memories which may, individually or collectively, be configured to perform various functions herein (for example, as part of a processing system).

The at least one processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1535 may be configured to operate a memory array using a memory controller. In some other cases, a memory controller may be integrated into one or more of the at least one processor 1535. The at least one processor 1535 may be configured to execute computer-readable instructions stored in a memory (e.g., one or more of the at least one memory 1525) to cause the device 1505 to perform various functions (e.g., functions or tasks supporting NTN discontinuous operation coexistence). For example, the device 1505 or a component of the device 1505 may include at least one processor 1535 and at least one memory 1525 coupled with one or more of the at least one processor 1535, the at least one processor 1535 and the at least one memory 1525 configured to perform various functions described herein. The at least one processor 1535 may be an example of a cloud-computing platform (e.g., one or more physical nodes and supporting software such as operating systems, virtual machines, or container instances) that may host the functions (e.g., by executing code 1530) to perform the functions of the device 1505. The at least one processor 1535 may be any one or more suitable processors capable of executing scripts or instructions of one or more software programs stored in the device 1505 (such as within one or more of the at least one memory 1525). In some examples, the at least one processor 1535 may include multiple processors and the at least one memory 1525 may include multiple memories. One or more of the multiple processors may be coupled with one or more of the multiple memories, which may, individually or collectively, be configured to perform various functions herein. In some examples, the at least one processor 1535 may be a component of a processing system, which may refer to a system (such as a series) of machines, circuitry (including, for example, one or both of processor circuitry (which may include the at least one processor 1535) and memory circuitry (which may include the at least one memory 1525)), or components, that receives or obtains inputs and processes the inputs to produce, generate, or obtain a set of outputs. The processing system may be configured to perform one or more of the functions described herein. As such, the at least one processor 1535 or a processing system including the at least one processor 1535 may be configured to, configurable to, or operable to cause the device 1505 to perform one or more of the functions described herein. Further, as described herein, being "configured to," being "configurable to," and being "operable to" may be used interchangeably and may be associated with a capability, when executing code stored in the at least one memory 1525 or otherwise, to perform one or more of the functions described herein.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the at least one memory 1525, the code 1530, and the at least one processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication in accordance with examples as disclosed herein. For example, the communications manager 1520 is capable of, configured to, or operable to support a means for transmitting one or more control messages including information indicative of a resource allocation associated with a discontinuous operation at a serving cell of a UE, where the resource allocation is in association with at least one NTN cell serving a coverage area including the UE. The communications manager 1520 is capable of, configured to, or operable to support a means for communicating, during an active period associating with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell. The communications manager 1520 is capable of, configured to, or operable to support a means for communicating, during an inactive period associating with the discontinuous operation at the serving cell, one or more signals via second frequency resources of a second frequency band in accordance with the resource allocation associated with the discontinuous operation.

By including or configuring the communications manager 1520 in accordance with examples as described herein, the device 1505 may support techniques for more efficient utilization of communication resources, improved coordination between devices, and improved utilization of processing capability.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, one or more of the at least one processor 1535, one or more of the at least one memory 1525, the code 1530, or any combination thereof (for example, by a processing system including at least a portion of the at least one processor 1535, the at least one memory 1525, the code 1530, or any combination thereof). For example, the code 1530 may include instructions executable by one or more of the at least one processor 1535 to cause the device 1505 to perform various aspects of NTN discontinuous operation coexistence as described herein, or the at least one processor 1535 and the at least one memory 1525 may be otherwise configured to, individually or collectively, perform or support such operations.

FIG. 16 shows a flowchart illustrating a method 1600 that supports NTN discontinuous operation coexistence in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving one or more control messages including information indicative of a resource allocation associated with a discontinuous operation at a serving cell of the UE, where the resource allocation is further in association with at least one NTN cell serving a coverage area including the UE. The operations of block 1605 may be performed in accordance with examples as disclosed herein, such as in accordance with the resource allocation diagram 300 of FIG. 3, the resource allocation diagram 400 of FIG. 4, the resource allocation diagram 500 of FIG. 5, the resource allocation diagram 600 of FIG. 6, and the transmission of control messages at 730 of FIG. 7. For example, the one or more control messages received at 1605 may be examples of the one or more control messages communicated at 730. Further, the resource allocation indicated by the one or more control messages may be illustrated by the resource allocation diagram 300 of FIG. 3, the resource allocation diagram 400 of FIG. 4, the resource allocation diagram 500 of FIG. 5, or the resource allocation diagram 600 of FIG. 6. In some examples, aspects of the operations of 1605 may be performed by a resource allocation component 1025 as described with reference to FIG. 10.

At 1610, the method may include communicating, during an active period associated with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell. The operations of block 1610 may be performed in accordance with examples as disclosed herein, such as in accordance with the active period 330-*a* and the active period 335-*a* of FIG. 3, the active period 420 of FIG. 4, the active period 520 of FIG. 5, the active period 620 of FIG. 6, and the communication of one or more data messages at 735 of FIG. 7. In some examples, aspects of the operations of 1610 may be performed by an active period communication component 1030 as described with reference to FIG. 10.

At 1615, the method may include communicating, during an inactive period associated with the discontinuous operation at the serving cell, one or more signals via second frequency resources of a second frequency band in accordance with the resource allocation associated with the discontinuous operation. The operations of block 1615 may be performed in accordance with examples as disclosed herein, such as the resource 325-*b* and the resource 320-*b* of FIG. 3, the non-active period 425 of FIG. 4, the non-active period 525 of FIG. 5, the non-active period 625 of FIG. 6, and the transmission of one or more signals at 740 of FIG. 7. In some examples, aspects of the operations of 1615 may be performed by an inactive period communication component 1035 as described with reference to FIG. 10.

FIG. 17 shows a flowchart illustrating a method 1700 that supports NTN discontinuous operation coexistence in accordance with aspects of the present disclosure. The operations of the method 1700 may be implemented by a network entity or its components as described herein. For example, the operations of the method 1700 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1705, the method may include transmitting one or more control messages including information indicative of a resource allocation associated with a discontinuous operation at a serving cell of a UE, where the resource allocation is in association with at least one NTN cell serving a coverage area including the UE. The operations of block 1705 may be performed in accordance with examples as disclosed herein, such as the resource allocation diagram 300 of FIG. 3, the resource allocation diagram 400 of FIG. 4, the resource allocation diagram 500 of FIG. 5, the resource allocation diagram 600 of FIG. 6, and the transmission of control messages at 730 of FIG. 7. For example, the one or more control messages transmitted at 1705 may be examples of the one or more control messages communicated at 730. Further, the resource allocation indicated by the one or more control messages may be illustrated by the resource allocation diagram 300 of FIG. 3, the resource allocation diagram 400 of FIG. 4, the resource allocation diagram 500 of FIG. 5, or the resource allocation diagram 600 of FIG. 6. In some examples, aspects of the operations of 1705 may be performed by a resource allocation component 1425 as described with reference to FIG. 14.

At 1710, the method may include communicating, during an active period associated with the discontinuous operation at the serving cell, one or more data messages via first frequency resources of a first frequency band in accordance with the resource allocation associated with the discontinuous operation, where the active period at the serving cell is non-overlapping with a second active period associated with a second discontinuous operation at a second cell. The operations of block 1710 may be performed in accordance with examples as disclosed herein, such as the active period 330-*a* and the active period 335-*a* of FIG. 3, the active period 420 of FIG. 4, the active period 520 of FIG. 5, the active period 620 of FIG. 6, and the communication of one or more data messages at 735 of FIG. 7. In some examples, aspects of the operations of 1710 may be performed by an active period communication component 1430 as described with reference to FIG. 14.

At 1715, the method may include communicating, during an inactive period associated with the discontinuous operation at the serving cell, one or more signals via second frequency resources of a second frequency band in accordance with the resource allocation associated with the discontinuous operation. The operations of block 1715 may be performed in accordance with examples as disclosed herein, such as the resource 325-*b* and the resource 320-*b* of FIG. 3, the non-active period 425 of FIG. 4, the non-active period 525 of FIG. 5, the non-active period 625 of FIG. 6, and the transmission of one or more signals at 740 of FIG. 7. In some examples, aspects of the operations of 1715 may be performed by an inactive period communication component 1435 as described with reference to FIG. 14.

The following provides an overview of aspects of the present disclosure:

Aspect 1: A method for wireless communication at a UE, comprising: receiving one or more control messages including information indicative of a resource allocation associated with a discontinuous operation at a serving cell of the UE, wherein the resource allocation is further in association with at least one NTN cell serving a coverage area including the UE; communicating, during an active period associated with the discontinuous operation at the serving cell, one or more data messages via first frequency resources of a first frequency band in accordance with the resource allocation associated with the discontinuous operation, wherein the active period at the serving cell is non-overlapping with a second active period associated with a second discontinuous operation at a second cell; and communicating, during an inactive period associated with the discontinuous operation at the serving cell, one or more signals via second frequency resources of a second frequency band in accordance with the resource allocation associated with the discontinuous operation.

Aspect 2: The method of aspect 1, further comprising: communicating a SSB, an SIB, a RACH message, one or more reference signals, or a combination thereof via one or more reserved resources during the inactive period, wherein the one or more signals include the SSB, the SIB, the RACH message, the one or more reference signals, or the combination thereof, and wherein the one or more reserved resources include the second frequency resources of the second frequency band.

Aspect 3: The method of any of aspects 1 through 2, further comprising: refraining from communicating, during the active period, via a subset of frequency resources of the first frequency band in accordance with the resource allocation associated with the discontinuous operation, wherein the subset of frequency resources are reserved for one or more second signals communicated between a second UE and the second cell.

Aspect 4: The method of aspect 3, wherein the one or more second signals include a SSB, an SIB, a RACH message, one or more reference signals, or a combination thereof.

Aspect 5: The method of any of aspects 1 through 4, further comprising: receiving, via the one or more control messages, an indication that the first frequency band is configured as a secondary cell activated during a first portion of the active period and deactivated during a second portion of the active period and the inactive period; and receiving, via the one or more control messages, an indication that the second frequency band is configured as a primary cell activated during both the active period and the inactive period.

Aspect 6: The method of aspect 5, further comprising: communicating, during the first portion of the active period, via the primary cell or the secondary cell in accordance with the resource allocation associated with the discontinuous operation; and communicating, during the second portion of the active period and the inactive period, via the primary cell in accordance with the resource allocation associated with the discontinuous operation.

Aspect 7: The method of any of aspects 5 through 6, wherein communication of the one or more signals is restricted from the secondary cell in accordance with the resource allocation associated with the discontinuous operation.

Aspect 8: The method of any of aspects 1 through 7, further comprising: receiving, via the one or more control messages, an indication that the first frequency band is configured as a first BWP activated during a first portion of the active period and deactivated during a second portion of the active period and the inactive period; and receiving, via the one or more control messages, an indication that the second frequency band is configured as a second BWP activated during the second portion of the active period and the inactive period and deactivated during the first portion of the active period.

Aspect 9: The method of aspect 8, further comprising: communicating, during the first portion of the active period, via the first BWP in accordance with the resource allocation associated with the discontinuous operation; and communicating, during the second portion of the active period and the inactive period, via the second BWP in accordance with the resource allocation associated with the discontinuous operation.

Aspect 10: The method of any of aspects 8 through 9, wherein the second BWP is smaller than the first BWP, the first BWP overlaps at least partially with the second BWP, and communication of the one or more signals is restricted to the second BWP when the first bandwidth is activated and when the first BWP is deactivated in accordance with the resource allocation associated with the discontinuous operation.

Aspect 11: The method of any of aspects 1 through 10, further comprising: receiving, via the one or more control messages, an indication that the first frequency band is configured as a first BWP activated during the active period and deactivated during the inactive period; and receiving, via the one or more control messages, an indication that the second frequency band is configured as a second BWP activated during the inactive period and deactivated during the active period.

Aspect 12: The method of aspect 11, further comprising: communicating, during a first portion of the active period, via the first BWP in accordance with the resource allocation associated with the discontinuous operation; communicating, during a second portion of the active period, via a subset of the first BWP in accordance with the resource allocation associated with the discontinuous operation; and communicating, during the inactive period, via the second BWP in accordance with the resource allocation associated with the discontinuous operation.

Aspect 13: The method of aspect 12, wherein the second BWP is smaller than the first BWP, the first BWP overlaps at least partially with the second BWP, the subset of the first BWP is reserved for one or more second signals communicated between a second UE and the second cell, and communication of the one or more signals is restricted to the second BWP when the first bandwidth is activated and when the first BWP is deactivated in accordance with the resource allocation associated with the discontinuous operation.

Aspect 14: The method of any of aspects 1 through 13, further comprising: communicating, during an extension of the active period, via the second frequency band in accordance with the resource allocation associated with the discontinuous operation.

Aspect 15: The method of aspect 14, wherein during the extension of the active period, communication to or from the UE is restricted to the second frequency band in accordance with the resource allocation associated with the discontinuous operation.

Aspect 16: The method of any of aspects 1 through 15, further comprising: transmitting a report indicating a capability of the UE to support the resource allocation associated with the discontinuous operation, wherein the resource allocation is in association with the serving cell of the UE being a first NTN cell and the second cell being a second NTN cell.

Aspect 17: The method of any of aspects 1 through 16, further comprising: transmitting a first report indicating a first capability of the UE to support the resource allocation associated with the discontinuous operation, wherein the resource allocation is in association with the serving cell of the UE being an NTN cell; and transmitting a second report indicating a second capability of the UE to support the resource allocation associated with the discontinuous operation, wherein the resource allocation is in association with the serving cell of the UE being a terrestrial network cell.

Aspect 18: The method of any of aspects 1 through 17, further comprising: receiving an indication of ephemeris information associated with one or more cells adjacent to the serving cell, wherein the serving cell is an NTN cell and the one or more cells adjacent to the serving cell are one or more other NTN cells; and determining a propagation delay for the NTN cell relative to the one or more other NTN cells based at least in part on the indication of the ephemeris information, wherein the resource allocation is based at least in part on the propagation delay.

Aspect 19: The method of any of aspects 1 through 18, further comprising: receiving an activation or deactivation message associated with the discontinuous operation.

Aspect 20: The method of any of aspects 1 through 19, wherein the resource allocation is in association with the at least one NTN cell and at least one terrestrial network cell each serving the coverage area including the UE.

Aspect 21: The method of aspect 20, further comprising: receiving one or more first signals via the at least one NTN cell; receiving one or more second signals via the at least one terrestrial network cell; determining a first propagation delay associated with the at least one NTN cell and a second propagation delay associated with the at least one terrestrial network cell; and transmitting a report of the first propagation delay, the second propagation delay, or both.

Aspect 22: The method of any of aspects 20 through 21, further comprising: receiving ephemeris information associated with the at least one NTN cell via an NTN configuration information element associated with the at least one NTN cell.

Aspect 23: The method of any of aspects 1 through 22, wherein the one or more signals are restricted to the second frequency band in accordance with the resource allocation associated with the discontinuous operation, and the second frequency band is smaller than the first frequency band.

Aspect 24: The method of any of aspects 1 through 23, wherein the resource allocation allocates the first frequency band to the UE during active periods associated with the discontinuous operation and allocates the second frequency band to the UE during inactive periods associated with the discontinuous operation.

Aspect 25: The method of any of aspects 1 through 24, wherein at least a portion of the first frequency band is non-overlapping with the second frequency band.

Aspect 26: The method of any of aspects 1 through 25, wherein the at least one NTN cell includes the serving cell of the UE, the second cell, or both, and the second cell is a neighbor cell to the serving cell of the UE.

Aspect 27: A method for wireless communication at a network entity, comprising: transmitting one or more control messages including information indicative of a resource allocation associated with a discontinuous operation at a serving cell of a UE, wherein the resource allocation is in association with at least one non-terrestrial network (NTN) cell serving a coverage area including the UE; communicating, during an active period associated with the discontinuous operation at the serving cell, one or more data messages via first frequency resources of a first frequency band in accordance with the resource allocation associated with the discontinuous operation, wherein the active period at the serving cell is non-overlapping with a second active period associated with a second discontinuous operation at a second cell; and communicating, during an inactive period associated with the discontinuous operation at the serving cell, one or more signals via second frequency resources of a second frequency band in accordance with the resource allocation associated with the discontinuous operation.

Aspect 28: The method of aspect 27, further comprising: communicating with the UE in accordance with the resource allocation associated with the discontinuous operation; and communicating, during at least a portion of the inactive period, with a second UE via the first frequency band and a subset of the second frequency band, wherein a remainder of the second frequency band outside of the subset of the second frequency band includes the second frequency resources via which the network entity and the UE communicate the one or more signals.

Aspect 29: The method of aspect 28, wherein at least the portion of the inactive period during which the network entity communicates with the second UE includes a second active period associated with a second discontinuous operation at a second serving cell of the second UE.

Aspect 30: The method of any of aspects 27 through 29, further comprising: transmitting, to the at least one NTN cell and one or more additional cells, the information indicative of the resource allocation associated with the discontinuous operation at the serving cell of the UE via a gateway, wherein the information includes an indication of reserved resources, a propagation delay associated with the at least one NTN cell and the one or more additional cells, or both.

Aspect 31: The method of any of aspects 27 through 30, further comprising: communicating a SSB, an SIB, a RACH message, one or more reference signals, or a combination thereof via one or more reserved resources during the inactive period, wherein the one or more signals include the SSB, the SIB, the RACH message, the one or more reference signals, or the combination thereof, and wherein the one or more reserved resources include the second frequency resources of the second frequency band.

Aspect 32: The method of any of aspects 27 through 31, further comprising: transmitting, via the one or more control messages, an indication that the first frequency band is configured as a secondary cell activated during a first portion of the active period and deactivated during a second portion of the active period and the inactive period; and transmitting, via the one or more control messages, an indication that the second frequency band is configured as a primary cell activated during both the active period and the inactive period.

Aspect 33: The method of aspect 32, further comprising: communicating, during the first portion of the active period, via the primary cell or the secondary cell in accordance with the resource allocation associated with the discontinuous operation; and communicating, during the second portion of active period and the inactive period, via the primary cell in accordance with the resource allocation associated with the discontinuous operation.

Aspect 34: The method of any of aspects 32 through 33, wherein communication of the one or more signals is restricted from the secondary cell in accordance with the resource allocation associated with the discontinuous operation.

Aspect 35: The method of any of aspects 27 through 34, further comprising: transmitting, via the one or more control messages, an indication that the first frequency band is configured as a first BWP activated during a first portion of the active period and deactivated during a second portion of the active period and the inactive period; and transmitting, via the one or more control messages, an indication that the second frequency band is configured as a second BWP activated during a second portion of the active period and the inactive period and deactivated during the first portion of the active period.

Aspect 36: The method of aspect 35, further comprising: communicating, during the first portion of the active period, via the first BWP in accordance with the resource allocation associated with the discontinuous operation; and communicating, during the second portion of the active period and the inactive period, via the second BWP in accordance with the resource allocation associated with the discontinuous operation.

Aspect 37: The method of any of aspects 35 through 36, wherein the second BWP is smaller than the first BWP, the first BWP overlaps at least partially with the second BWP, and communication of the one or more signals is restricted to the second BWP when the first bandwidth is activated and when the first BWP is deactivated in accordance with the resource allocation associated with the discontinuous operation.

Aspect 38: The method of any of aspects 27 through 37, further comprising: transmitting, via the one or more control messages, an indication that the first frequency band is configured as a first BWP activated during the active period and deactivated during the inactive period; and transmitting, via the one or more control messages, an indication that the second frequency band is configured as a second BWP activated during the inactive period and deactivated during the active period.

Aspect 39: The method of aspect 38, further comprising: communicating, during a first portion of the active period, via the first BWP in accordance with the resource allocation associated with the discontinuous operation; communicating, during a second portion of the active period, via a subset of the first BWP in accordance with the resource allocation associated with the discontinuous operation; and communicating, during the inactive period, via the second BWP in accordance with the resource allocation associated with the discontinuous operation.

Aspect 40: The method of aspect 39, wherein the second BWP is smaller than the first BWP, the first BWP overlaps at least partially with the second BWP, the subset of the first BWP is reserved for one or more second signals communicated between a second UE and the second cell, and communication of the one or more signals is restricted to the second BWP when the first bandwidth is activated and when the first BWP is deactivated in accordance with the resource allocation associated with the discontinuous operation.

Aspect 41: The method of any of aspects 27 through 40, further comprising: communicating, during an extension of the active period, via the second frequency band in accordance with the resource allocation associated with the discontinuous operation.

Aspect 42: The method of aspect 41, wherein during the extension of the active period, communication to or from the UE is restricted to the second frequency band in accordance with the resource allocation associated with the discontinuous operation.

Aspect 43: The method of any of aspects 27 through 42, further comprising: receiving a report indicating a capability of the UE to support the resource allocation associated with the discontinuous operation, wherein the resource allocation is in association with the serving cell of the UE being a first NTN cell and the second cell being a second NTN cell.

Aspect 44: The method of any of aspects 27 through 43, further comprising: receiving a first report indicating a first capability of the UE to support the resource allocation associated with the discontinuous operation, wherein the resource allocation is in association with the serving cell of the UE being an NTN cell; and receiving a second report indicating a second capability of the UE to support the resource allocation associated with the discontinuous operation, wherein the resource allocation is in association with the serving cell of the UE being a terrestrial network cell.

Aspect 45: The method of any of aspects 27 through 44, further comprising: transmitting an indication of ephemeris information associated with one or more cells adjacent to the serving cell, wherein the serving cell is an NTN cell and the one or more cells adjacent to the serving cell are one or more other NTN cells.

Aspect 46: The method of any of aspects 27 through 45, further comprising: transmitting an activation or deactivation message associated with the discontinuous operation.

Aspect 47: The method of any of aspects 27 through 46, wherein the resource allocation is in association with the at least one NTN cell and at least one terrestrial network cell each serving the coverage area including the UE.

Aspect 48: The method of aspect 47, further comprising: transmitting one or more first signals via the at least one NTN cell; transmitting one or more second signals via the at least one terrestrial network cell; and receiving a report of a first propagation delay, a second propagation delay, or both.

Aspect 49: The method of any of aspects 47 through 48, wherein the network entity is associated with the at least one terrestrial network cell, the method further comprising: receiving an indication of ephemeris information from the at least one NTN cell; and estimating, at the at least one terrestrial network cell, an average propagation delay between the UE and the at least one NTN cell.

Aspect 50: The method of any of aspects 47 through 49, further comprising: transmitting ephemeris information associated with the at least one NTN cell via an NTN configuration information element associated with the at least one NTN cell.

Aspect 51: The method of any of aspects 27 through 50, wherein the one or more signals are restricted to the second frequency band in accordance with the resource allocation associated with the discontinuous operation, and the second frequency band is smaller than the first frequency band.

Aspect 52: The method of any of aspects 27 through 51, wherein the resource allocation allocates the first frequency band to the UE during active periods associated with the discontinuous operation and allocates the second frequency band to the UE during inactive periods associated with the discontinuous operation.

Aspect 53: The method of any of aspects 27 through 52, wherein at least a portion of the first frequency band is non-overlapping with the second frequency band.

Aspect 54: The method of any of aspects 27 through 53, wherein the at least one NTN cell includes the serving cell of the UE, the second cell, or both, and the second cell is a neighbor cell to the serving cell of the UE.

Aspect 55: A UE, comprising one or more memories storing processor-executable code, and one or more processors coupled with the one or more memories and individually or collectively operable to execute the code to cause the UE to perform a method of any of aspects 1 through 26.

Aspect 56: A UE, comprising one or more processors; one or more memories coupled with the one or more processors; and one or more processor-readable instructions stored in the one or more memories and executable by the one or more processors, individually or collectively, to cause the UE to perform a method of any of aspects 1 through 26.

Aspect 57: A UE, comprising at least one means for performing a method of any of aspects 1 through 26.

Aspect 58: A non-transitory computer-readable medium storing code for wireless communication, the code comprising instructions executable by at least one processor, individually or collectively, to perform a method of any of aspects 1 through 26.

Aspect 59: A network entity, comprising one or more memories storing processor-executable code, and one or more processors coupled with the one or more memories and individually or collectively operable to execute the code to cause the network entity to perform a method of any of aspects 27 through 54.

Aspect 60: A network entity, comprising one or more processors; one or more memories coupled with the one or more processors; and one or more processor-readable instructions stored in the one or more memories and executable by the one or more processors, individually or collectively, to cause the network entity to perform a method of any of aspects 27 through 54.

Aspect 61: A network entity, comprising at least one means for performing a method of any of aspects 27 through 54.

Aspect 62: A non-transitory computer-readable medium storing code for wireless communication, the code comprising instructions executable by at least one processor, individually or collectively, to perform a method of any of aspects 27 through 54.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more processors;
one or more memories coupled with the one or more processors; and
one or more processor-readable instructions stored in the one or more memories and executable by the one or more processors, individually or collectively, to cause the UE to:
receive one or more control messages including information indicative of a resource allocation associated with a discontinuous operation at a serving cell of the UE, wherein the resource allocation is further in association with at least one non-terrestrial network (NTN) cell serving a coverage area including the UE;
communicate, during an active period associated with the discontinuous operation at the serving cell, one or more data messages via first frequency resources of a first frequency band in accordance with the resource allocation associated with the discontinuous operation, wherein the active period at the serving cell is non-overlapping with a second active period associated with a second discontinuous operation at a second cell; and
communicate, during an inactive period associated with the discontinuous operation at the serving cell, one or more signals via second frequency resources of a second frequency band in accordance with the resource allocation associated with the discontinuous operation.

2. The UE of claim 1, wherein the one or more processors are individually or collectively further operable to execute the instructions to cause the UE to:

communicate a synchronization signal block (SSB), a system information block (SIB), a random access channel (RACH) message, one or more reference signals, or a combination thereof via one or more reserved resources during the inactive period, wherein the one or more signals include the SSB, the SIB, the RACH message, the one or more reference signals, or the combination thereof, and wherein the one or more reserved resources include the second frequency resources of the second frequency band.

3. The UE of claim 1, wherein the one or more processors are individually or collectively further operable to execute the instructions to cause the UE to:

refrain from communicating, during the active period, via a subset of frequency resources of the first frequency band in accordance with the resource allocation associated with the discontinuous operation, wherein the subset of frequency resources are reserved for one or more second signals communicated between a second UE and the second cell.

4. The UE of claim 3, wherein the one or more second signals include a synchronization signal block (SSB), a system information block (SIB), a random access channel (RACH) message, one or more reference signals, or a combination thereof.

5. The UE of claim 1, wherein the one or more processors are individually or collectively further operable to execute the instructions to cause the UE to:

receive, via the one or more control messages, an indication that the first frequency band is configured as a secondary cell activated during a first portion of the active period and deactivated during a second portion of the active period and the inactive period; and receive, via the one or more control messages, an indication that the second frequency band is configured as a primary cell activated during both the active period and the inactive period.

6. The UE of claim 5, wherein the one or more processors are individually or collectively further operable to execute the instructions to cause the UE to:

communicate, during the first portion of the active period, via the primary cell or the secondary cell in accordance with the resource allocation associated with the discontinuous operation; and communicate, during the second portion of the active period and the inactive period, via the primary cell in accordance with the resource allocation associated with the discontinuous operation.

7. The UE of claim 5, wherein communication of the one or more signals is restricted from the secondary cell in accordance with the resource allocation associated with the discontinuous operation.

8. The UE of claim 1, wherein the one or more processors are individually or collectively further operable to execute the instructions to cause the UE to:

receive, via the one or more control messages, an indication that the first frequency band is configured as a first bandwidth part activated during a first portion of the active period and deactivated during a second portion of the active period and the inactive period; and receive, via the one or more control messages, an indication that the second frequency band is configured as a second bandwidth part activated during the second portion of the active period and the inactive period and deactivated during the first portion of the active period.

9. The UE of claim 8, wherein the one or more processors are individually or collectively further operable to execute the instructions to cause the UE to:

communicate, during the first portion of the active period, via the first bandwidth part in accordance with the resource allocation associated with the discontinuous operation; and communicate, during the second portion of the active period and the inactive period, via the second bandwidth part in accordance with the resource allocation associated with the discontinuous operation.

10. The UE of claim 8, wherein the second bandwidth part is smaller than the first bandwidth part, wherein the first bandwidth part overlaps at least partially with the second bandwidth part, and wherein communication of the one or more signals is restricted to the second bandwidth part when the first bandwidth part is activated and when the first bandwidth part is deactivated in accordance with the resource allocation associated with the discontinuous operation.

11. The UE of claim 1, wherein the one or more processors are individually or collectively further operable to execute the instructions to cause the UE to:

receive, via the one or more control messages, an indication that the first frequency band is configured as a first bandwidth part activated during the active period and deactivated during the inactive period; and receive, via the one or more control messages, an indication that the second frequency band is configured as a second bandwidth part activated during the inactive period and deactivated during the active period.

12. The UE of claim 11, wherein the one or more processors are individually or collectively further operable to execute the instructions to cause the UE to:

communicate, during a first portion of the active period, via the first bandwidth part in accordance with the resource allocation associated with the discontinuous operation;

communicate, during a second portion of the active period, via a subset of the first bandwidth part in accordance with the resource allocation associated with the discontinuous operation; and communicate, during the inactive period, via the second bandwidth part in accordance with the resource allocation associated with the discontinuous operation.

13. The UE of claim 12, wherein the second bandwidth part is smaller than the first bandwidth part, wherein the first bandwidth part overlaps at least partially with the second bandwidth part, wherein the subset of the first bandwidth part is reserved for one or more second signals communicated between a second UE and the second cell, and wherein communication of the one or more signals is restricted to the second bandwidth part when the first bandwidth part is activated and when the first bandwidth part is deactivated in accordance with the resource allocation associated with the discontinuous operation.

14. A network entity, comprising:

one or more processors;

one or more memories coupled with the one or more processors; and one or more processor-readable instructions stored in the one or more memories and executable by the one or more processors individually or collectively to cause the network entity to:

transmit one or more control messages including information indicative of a resource allocation associated with a discontinuous operation at a serving cell of a user equipment (UE), wherein the resource allocation is in association with at least one non-terrestrial network (NTN) cell serving a coverage area including the UE;

communicate, during an active period associated with the discontinuous operation at the serving cell, one or more data messages via first frequency resources of a first frequency band in accordance with the resource allocation associated with the discontinuous operation, wherein the active period at the serving cell is non-overlapping with a second active period associated with a second discontinuous operation at a second cell; and communicate, during an inactive period associated with the discontinuous operation at the serving cell, one or more signals via second frequency resources of a second frequency band in accordance with the resource allocation associated with the discontinuous operation.

15. The network entity of claim 14, wherein the one or more processors are individually or collectively further operable to execute the instructions to cause the network entity to:

communicate with the UE in accordance with the resource allocation associated with the discontinuous operation; and communicate, during at least a portion of the inactive period, with a second UE via the first frequency band and a subset of the second frequency band, wherein a remainder of the second frequency band outside of the subset of the second frequency band include the second frequency resources via which the network entity and the UE communicate the one or more signals.

16. The network entity of claim 15, wherein at least the portion of the inactive period during which the network entity communicates with the second UE includes a second active period associated with a second discontinuous operation at a second serving cell of the second UE.

17. The network entity of claim 14, wherein the one or more processors are individually or collectively further operable to execute the instructions to cause the network entity to:

transmit, to the at least one NTN cell and one or more additional cells, the information indicative of the resource allocation associated with the discontinuous operation at the serving cell of the UE via a gateway, wherein the information includes an indication of reserved resources, a propagation delay associated with the at least one NTN cell and the one or more additional cells, or both.

18. The network entity of claim 14, wherein the one or more processors are individually or collectively further operable to execute the instructions to cause the network entity to:

communicate a synchronization signal block (SSB), a system information block (SIB), a random access channel (RACH) message, one or more reference signals, or a combination thereof via one or more reserved resources during the inactive period, wherein the one or more signals include the SSB, the SIB, the RACH message, the one or more reference signals, or the combination thereof, and wherein the one or more reserved resources include the second frequency resources of the second frequency band.

19. A method for wireless communication at a user equipment (UE), comprising:

receiving one or more control messages including information indicative of a resource allocation associated with a discontinuous operation at a serving cell of the UE, wherein the resource allocation is further in association with at least one non-terrestrial network (NTN) cell serving a coverage area including the UE;

communicating, during an active period associated with the discontinuous operation at the serving cell, one or more data messages via first frequency resources of a first frequency band in accordance with the resource allocation associated with the discontinuous operation, wherein the active period at the serving cell is non-overlapping with a second active period associated with a second discontinuous operation at a second cell; and communicating, during an inactive period associated with the discontinuous operation at the serving cell, one or more signals via second frequency resources of a second frequency band in accordance with the resource allocation associated with the discontinuous operation.

20. The method of claim 19, further comprising:

communicating, during an extension of the active period, via the second frequency band in accordance with the resource allocation associated with the discontinuous operation.

21. The method of claim 20, wherein, during the extension of the active period, communication to or from the UE is restricted to the second frequency band in accordance with the resource allocation associated with the discontinuous operation.

22. The method of claim 19, further comprising:

transmitting a report indicating a capability of the UE to support the resource allocation associated with the discontinuous operation, wherein the resource allocation is in association with the serving cell of the UE being a first NTN cell and the second cell being a second NTN cell.

23. The method of claim 19, further comprising:

transmitting a first report indicating a first capability of the UE to support the resource allocation associated with the discontinuous operation, wherein the resource allocation is in association with the serving cell of the UE being an NTN cell; and transmitting a second report indicating a second capability of the UE to support the resource allocation associated with the discontinuous operation, wherein the resource allocation is in association with the serving cell of the UE being a terrestrial network cell.

24. The method of claim 19, further comprising:

receiving an indication of ephemeris information associated with one or more cells adjacent to the serving cell, wherein the serving cell is an NTN cell and the one or more cells adjacent to the serving cell are one or more other NTN cells; and determining a propagation delay for the NTN cell relative to the one or more other NTN cells based at least in part on the indication of the ephemeris information, wherein the resource allocation is based at least in part on the propagation delay.

25. The method of claim 19, further comprising:

receiving an activation or deactivation message associated with the discontinuous operation.

26. The method of claim 19, wherein the resource allocation is in association with the at least one NTN cell and at least one terrestrial network cell each serving the coverage area including the UE.

27. The method of claim 26, further comprising:

receiving one or more first signals via the at least one NTN cell;

receiving one or more second signals via the at least one terrestrial network cell;

determining a first propagation delay associated with the at least one NTN cell and a second propagation delay associated with the at least one terrestrial network cell; and transmitting a report of the first propagation delay, the second propagation delay, or both.

28. The method of claim 26, further comprising:

receiving ephemeris information associated with the at least one NTN cell via an NTN configuration information element associated with the at least one NTN cell.

29. A method for wireless communication at a network entity, comprising:

transmitting one or more control messages including information indicative of a resource allocation associated with a discontinuous operation at a serving cell of a user equipment (UE), wherein the resource allocation is in association with at least one non-terrestrial network (NTN) cell serving a coverage area including the UE;

communicating, during an active period associated with the discontinuous operation at the serving cell, one or more data messages via first frequency resources of a first frequency band in accordance with the resource allocation associated with the discontinuous operation, wherein the active period at the serving cell is non-overlapping with a second active period associated with a second discontinuous operation at a second cell; and communicating, during an inactive period associated with the discontinuous operation at the serving cell, one or more signals via second frequency resources of a second frequency band in accordance with the resource allocation associated with the discontinuous operation.

30. The method of claim 29, wherein the resource allocation is in association with the at least one NTN cell and at least one terrestrial network cell each serving the coverage area including the UE, the method further comprising:

transmitting one or more first signals via the at least one NTN cell;

transmitting one or more second signals via the at least one terrestrial network cell; and receiving a report of a first propagation delay, a second propagation delay, or both.

* * * * *